United States Patent
Kakuta et al.

(10) Patent No.: US 6,661,770 B2
(45) Date of Patent: Dec. 9, 2003

(54) OPTICAL INFORMATION RECORDING MEDIUM

(75) Inventors: Takeshi Kakuta, Kanagawa (JP); Shinji Saito, Kanagawa (JP); Toshio Ishida, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 5 days.

(21) Appl. No.: 10/131,258

(22) Filed: Apr. 25, 2002

(65) Prior Publication Data
US 2003/0103442 A1 Jun. 5, 2003

(30) Foreign Application Priority Data

Apr. 26, 2001 (JP) .......................................... 2001-128733
Apr. 26, 2001 (JP) .......................................... 2001-128734
Jun. 21, 2001 (JP) .......................................... 2001-188777
Jun. 29, 2001 (JP) .......................................... 2001-199845

(51) Int. Cl.$^7$ .............................. G11B 7/24; B32B 3/02
(52) U.S. Cl. .................. 369/275.4; 369/288; 428/64.4
(58) Field of Search ....................... 369/275.4, 275.2, 369/288, 283, 275.1, 275.3, 112.23, 280, 13.35, 13.38; 428/64.4, 64.1, 64.2, 64.9; 264/1.33

(56) References Cited

U.S. PATENT DOCUMENTS

| | | | | |
|---|---|---|---|---|
| 6,049,521 A | * | 4/2000 | Aratani | 369/280 |
| 6,221,455 B1 | * | 4/2001 | Yasuda et al. | 428/64.1 |
| 6,246,656 B1 | * | 6/2001 | Kawakubo et al. | 369/112.23 |

* cited by examiner

Primary Examiner—Ali Neyzari
(74) Attorney, Agent, or Firm—Sughrue Mion, PLLC

(57) ABSTRACT

An optical recording medium that is excellent in both C/N and reproducing durability and is capable of carrying out high density recording with excellent sensitivity and reflectivity. The optical recording medium comprises a substrate having grooves with specified dimensions, and a recording layer comprising an organic substance having at least one maximum absorption peak in each of a range from 600 to 800 nm and a range from 300 to 400 nm. In another aspect, the optical information recording medium includes a recording layer comprising a certain organic substance and capable of recording information by irradiation with laser light having a wavelength of from 380 to 500 nm through a lens having an aperture (NA) of 0.7 or more, and a substrate having grooves with specified dimensions.

20 Claims, 1 Drawing Sheet

OPTICAL INFORMATION RECORDING MEDIUM

BACKGROUND OF THE PRESENT INVENTION

1. Field of the Present Invention

The present invention relates to an optical information recording medium, and more particularly to an optical information recording medium capable of recording and replaying information by irradiation of laser light.

2. Description of the Related Art

A high-density optical information recording medium (DVD) that records and reproduces a large amount of text information, image information and sound information is increasingly demanded. In particular, in order to accommodate picture recording for digital HDTV broadcast, further increase of a recording density of an optical recording medium is earnestly studied. Increase of the recording density has been attained, for example, by shortening a wavelength of laser light used for recording and replaying on an optical recording medium, or by increasing an aperture (NA) of an objective lens of an optical system of an apparatus for recording and replaying. Under these circumstances, blue-violet lasers have been put on the market.

There is a phase change-type optical disk known as a DVD, which employs an alloy layer, such as GeSbTe, as a recording layer. The recording layer is heated for a moment with laser light to cause a phase change from a crystalline state to an amorphous state. A change in reflection coefficient due to the phase change is utilized for recording and replaying. In recent years, a DVD system has been reported ("ISOM2000", pp. 210 to 211) in which recording and replaying are carried out with a blue-violet laser by using the phase change-type recording layer. The demand for high density recording has been attained to a certain extent by this system, but there is a problem that the durability of the recording layer to repeated replaying is insufficient.

A recordable DVD (DVD-R) that can record information only once is also known among DVDs. The DVD-R has a basic constitution of an optical disk including a substrate having grooves and, formed thereon, a recording layer, a reflective layer and a protective layer. In general, structures are known in which such optical disks each having a substrate with a reflective layer and a protective layer are attached to each other at the sides of the protective layers with an adhesive, or such an optical disk and an optical disk formed with a single substrate are attached to each other. Additionally, a constitution is also known in which a reflective layer, a recording layer and a cover layer are provided on a substrate in this order, and recording and replaying with laser light are carried out on the side of the cover layer.

Red laser light having a wavelength of 635 or 650 nm is generally used for recording and replaying of the DVD-R. However, there is an increasing demand for recording density on DVD-Rs. In order to attain high density recording, recording and replaying with laser light having a shorter wavelength instead of the red laser light become necessary. In order to attain high density recording of the DVD-R, the use of laser light of a shorter wavelength and the use of an objective lens of a higher NA have been considered.

In general, the energy of light increases inversely proportionally to the wavelength, and when the wavelength of laser light is decreased for high density recording of an optical disk, the light energy applied to the optical disk is increased. In particular, DVD-R uses a layer of an organic substance as a recording layer, and therefore the recording layer is deteriorated upon repeated irradiation with light for replaying (replaying deterioration), causing a problem in durability. Reduction of the laser output has been considered, but the reflection is lowered when the replaying output is decreased, which causes problems of reduction in RF output, reduction in C/N (carrier to noise ratio), and reduction in reproducing durability.

Another optical information recording medium (optical disk) that can record information only once with laser light has also been known. This optical disk is referred to as a recordable CD ("CD-R"), and a representative structure thereof includes a transparent disk substrate having laminated thereon a recording layer formed with an organic substance, a reflective layer formed with a metal such as gold, and a protective layer formed with resin, in this order. Recording of information on the CD-R is carried out by irradiation with laser light in the near infrared region (which is generally laser light having a wavelength around 780 nm), and the recording is attained by a mechanism in which the temperature of an irradiated part of the recording layer is locally increased by absorbing the light, and the optical characteristics of that part are changed by a physical or chemical change (such as formation of a pit), so as to attain recording of information. The reading of information (replaying) is carried out by irradiation on the CD-R with laser light of the same wavelength as the laser light for recording, and a change in reflectivity between parts of the recording layer having the changed optical characteristics (recorded part) and parts having the unchanged optical characteristics (unrecorded part) is detected, so as to attain replaying.

In recent years, an optical information recording medium having a higher recording density has been demanded. In order to deal with this demand, the optical disk referred to as a recordable digital versatile disk ("DVD-R") has been demanded (described, for example, in "NIKKEI NEW MEDIA", additional volume "DVD", published 1995). In the structure of the DVD-R, the two disks, each containing a transparent disk substrate, generally have guide grooves (also referred to as grooves or pregrooves) for tracking irradiated laser light which are formed with a small half-value width (0.74 to 0.8 μm), which is less than a half of that of the CD-R, and a recording layer containing an organic substance, the reflective layer and protective layer laminated on the substrate in this order, and are attached to each other with the recording layers turned inside, or are attached to each other with the recording layers turned inside with a disk protective substrate interposed therebetween. Because recording and replaying of the DVD-R is carried out by irradiating with visible laser light (which is generally laser light having a wavelength in a range from 630 to 680 nm), recording with a higher density than the CD-R can be attained.

Networks, such as the Internet, and high resolution TV are quickly spreading these days. Test broadcasts of HDTV (high definition television) have recently started. Under the circumstances, a recording medium of a large capacity is demanded that can easily record image information at low cost. The DVD-R sufficiently achieves the role of the large capacity recording medium under the current situation, but there is constantly increasing demand for larger capacity and higher density recording media, and it is necessary to develop a recording medium that can deal with these demands. Accordingly, development of a recording medium having a larger capacity, which can attain high density recording with light having a shorter wavelength than that for the DVD-R, is being continued.

For example, JP-A No. 4-74690, No. 7-304256, No. 7-304257, No. 8-127174, No. 11-53758, No. 11-334204, No. 11-334205, No. 11-334206, No. 11-334207, No. 2000-43423, No. 2000-108513, No. 2000-113504, No. 2000-149320, No. 2000-158818 and No. 2000-228028 disclose methods for recording and replaying, in which an optical information recording medium having a recording layer containing an organic substance is irradiated with laser light of a wavelength of 530 nm or less from the side of the recording layer toward the reflective layer, so as to attain recording and replaying of information. In these methods, an optical disk having a recording layer containing a substance such as a porphyrin compound, an azo organic substance, a metallic azo organic substance, a quinophthalone organic substance, a trimethylcyanine organic substance, an organic substance having a dicyanobiphenyl skeleton, a coumarin compound or a naphthalocyanine compound is irradiated with blue laser light (wavelength: 430 nm or 488 nm) or blue-green laser light (wavelength: 515 nm), so as to attain recording and replaying of information.

In order to attain compatibility with the CD-R system that is currently used, an optical information recording medium has been proposed that can attain recording and replaying with two kinds of laser light having different wavelengths. For example, JP-A No. 2000-141900, No. 2000-158816, No. 2000-185471, No. 2000-289342 and No. 2000-309165 propose such optical information recording media that can attain recording and replaying with either laser light of the near infrared region around 780 nm or visible laser light around 650 nm by using a mixture of an organic material used in CD-R and an organic material used in DVD-Rs.

However, according to investigations performed by the present inventors, the optical disks disclosed in the publications noted in the foregoing require further improvements, because they cannot provide the sensitivity that is practically demanded to record information by irradiation of laser light of a short wavelength from 380 to 500 nm, and other recording characteristics, such as reflectivity and a modulation degree, are also insufficient. In particular, the optical disks disclosed in the publications noted in the foregoing show lowered recording characteristics upon irradiation with laser light having a wavelength of from 380 to 500 nm.

SUMMARY OF THE PRESENT INVENTION

The present invention has been developed taking the foregoing problems into consideration, and an object thereof is to provide an optical recording medium that is excellent in both C/N (carrier to noise ratio) and reproducing durability and can attain high density recording without any problem.

Another object of the present invention is to provide an optical information recording medium that can attain recording and replaying in a high density by irradiation of blue laser light of a short wavelength of from 380 to 500 nm to exhibit excellent recording characteristics.

The foregoing objects are attained by the following optical recording media of the present invention.

The present invention relates to, as a first aspect, an optical recording medium including a substrate including an organic substance with at least one maximum absorption peak in each of a range from 600 to 800 nm and a range from 300 to 400 nm, the substrate including a groove that includes a track pitch of from 200 to 400 nm, a groove depth of from 50 to 150 nm and a groove half-value width of from 90 to 200 nm; a reflective layer on the substrate; a recording layer on the reflective layer; and a cover layer on the recording layer, wherein the medium is recordable and replayable using laser light including a wavelength of 450 nm or less and an objective lens including an aperture NA of 0.7 or more.

The present invention also relates to, as a second aspect, an optical recording medium including a substrate including an organic substance with at least one maximum absorption peak in each of a range from 600 to 800 nm and a range from 300 to 400 nm, the substrate including a groove that includes a track pitch of from 200 to 400 nm, a groove depth of from 50 to 150 nm and a groove half-value width of from 90 to 200 nm; a reflective layer on the substrate; and a recording layer on the reflective layer, wherein the medium is recordable and replayable using laser light including a wavelength of 450 nm or less and an objective lens including an aperture NA that is at least 0.5 and less than 0.7.

The present invention further relates to, as a third aspect, an optical information recording medium including a substrate including a groove depth of from 15 to 45 nm, a track pitch of from 250 to 400 nm, a groove half-value width of from 60 to 200 nm and a groove tilt angle of from 40° to 80°; a reflective layer on the substrate; a recording layer including an organic substance on the reflective layer, at which recording layer information is recordable and replayable by irradiating laser light including a wavelength of from 380 to 500 nm through a lens including an aperture NA of 0.7 or more; and a sheet layer on the recording layer.

DESCRIPTION OF THE PREFERRED EMBODIMENTS

Figure 1:
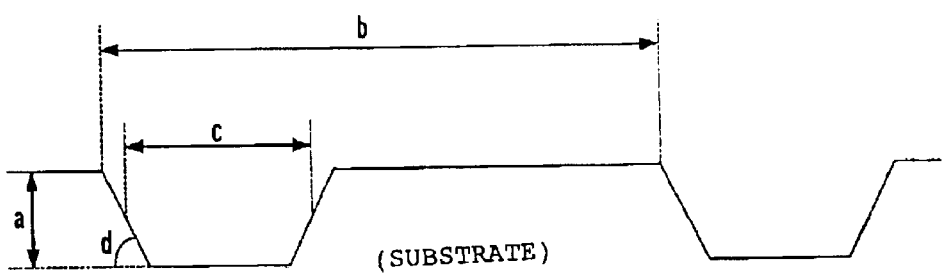
FIG. 1 is a cross sectional view showing a cross section in a radial direction of grooves of a substrate of an optical information recording medium according to a third aspect of the present invention.

An embodiment of the first aspect of the present invention will be described below.

An optical recording medium of the present invention includes a substrate having particular grooves having thereon a layer structure including a reflective layer, a recording layer and a cover layer provided in this order. Recording and replaying are carried out through the cover layer. The cover layer is adhered on the recording layer with an adhesive.

The substrate is provided with grooves, particularly grooves in a spiral form. The grooves have a track pitch of from 200 to 400 nm, a depth of from 50 to 150 nm and a half-value width of from 90 to 200 nm. As the recording layer, a recording layer is used that contains an organic substance having at least one maximum absorption peak in each of a range from 600 to 800 nm and a range from 300 to 400 nm.

The recording and replaying of the optical recording medium is carried out by using laser light having a wavelength of 450 nm or less and an objective lens having an aperture (NA) of 0.7 or more.

In the optical recording medium of the present invention, because the recording layer having the particular organic substance is provided on the substrate having the particular grooves formed thereon, it is excellent in both C/N (carrier to noise ratio) and reproducing durability, and can carry out high density recording without any problem.

Examples of the material of the substrate used in the optical recording medium include plastic substrates, such as polycarbonate, acrylic resin (e.g., polymethyl methacrylate), vinyl chloride resin (e.g., polyvinyl chloride or vinyl chloride copolymer), epoxy resin, amorphous polyolefin, polyester, and the like. Among these, polycarbonate is preferably used.

The recording layer formed in the optical recording medium of the present invention is principally formed as an organic substance recording layer. Known organic substances can be used without any limitation. The organic substances have such characteristics that they have at least one maximum absorption peak in each of a range from 600 to 800 nm and a range from 300 to 400 nm. Specifically, preferred examples thereof include organic substances disclosed in JP-A No. 4-74690, No. 8-127174, No. 11-53758, No. 11-334204, No. 11-334205, No. 11-334206, No. 11-334207, No. 2000-43423, No. 2000-108513 and No. 2000-158818, and triazol, triazine, cyanine, merocyanine, aminobutadiene, phthalocyanine, cinnamic acid, viologen, azo, oxonolbenzoxazole and benzotriazole organic compounds. More preferred examples thereof include cyanine, aminobutadiene, benzotriazole, phthalocyanine and rhodocyanine series organic compounds. Among these, phthalocyanine organic compounds having at least one maximum absorption peak in each of a range from 600 to 700 nm and a range from 300 to 400 nm are particularly preferred.

The formation of the organic substance recording layer is carried out by dissolving the organic substance and, depending on necessity, various kinds of additives such as a discoloration preventing agent, a binder, an antioxidant, a UV absorbent, a plasticizer and a lubricant in a solvent to prepare a coating composition, and the coating composition is coated on the surface of the substrate to prepare a coated film, which is then dried. Upon dissolving the organic substance and the discoloration preventing agent and the like in the solvent, it is preferred to carry out an ultrasonic dispersion treatment for complete dissolution. Examples of the solvent of the coating composition for the organic substance layer include esters, such as butyl acetate and cellosolve acetate, ketones, such as methyl ethyl ketone, cyclohexanone and methyl isobutyl ketone, chlorinated hydrocarbons, such as dichloromethane, 1,2-dichloroethane and chloroform, amides, such as dimethylformamide, hydrocarbons, such as cyclohexane, ethers, such as tetrahydrofuran, ethyl ether and dioxane, alcohols, such as ethanol, n-propanol, isopropanol, n-butanol and diacetone alcohol, fluorine solvents, such as 2,2,3,3-tetrafluoropropanol, and glycol ethers, such as ethylene glycol monomethyl ether, ethylene glycol monoethyl ether and propylene glycol monomethyl ether. The solvent may be used singly or as a combination of two or more of these, taking the solubility of the organic substance to be used into consideration.

Examples of the binder include natural organic polymer substances, such as gelatin, cellulose derivative, dextran, rosin and rubber, hydrocarbon resins, such as polyurethane, polyethylene, polypropylene, polystyrene and polyisobutylene, vinyl resins, such as polyvinyl chloride, polyvinylidene chloride and vinyl chloride-vinyl acetate copolymer, acrylic resins, such as polymethyl acrylate and polymethyl methacrylate, and synthetic organic polymers, such as polyvinyl alcohol, chlorinated polyethylene, epoxy resin, butyral resin, rubber derivatives and phenol-formaldehyde resin. In the case where the binder is used as the material of the organic substance recording layer, the usage amount of the binder is generally from 0.2 to 20 parts by weight, preferably from 0.5 to 10 parts by weight and more preferably from 1 to 5 parts by weight, per 100 parts by weight of the organic substance.

The concentration of the organic substance in the coating composition thus prepared is generally in a range from 0.01 to 10% by weight, and preferably in a range from 0.1 to 5% by weight.

Examples of the coating method include a spraying method, a spin coating method, a dipping method, a roll coating method, a blade coating method, a doctor roll method and a screen printing method. The spin coating method is preferably employed because fluctuation of the film thickness of the organic substance film in the circumferential direction can be reduced, to form a uniform film. The organic substance recording layer may be a single layer or may have a multilayer structure. The thickness of the organic substance recording layer is generally in a range from 20 to 500 nm, and preferably in a range from 50 to 300 nm.

The coating temperature of the organic substance coating composition may be in a range from 23 to 50° C. without any problem, and it is preferably from 24 to 40° C., and more preferably from 25 to 37° C.

The reflective layer formed in the optical recording medium of the present invention may be any reflective layer as long as it is a reflective layer having a high reflectivity to laser light, i.e., a reflectivity of 70% or more. Examples thereof include a metal or a metalloid, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi, and stainless steel. Among these, a reflective film containing Au or Ag is preferred, with a reflective film containing Ag or Au as a main component being particularly preferred.

The reflective layer can be formed on the organic substance recording layer, for example, by subjecting a light-reflective substance to vacuum deposition, sputtering or ion plating. The thickness of the light-reflective layer is generally in a range from 10 to 800 nm, preferably in a range from 20 to 500 nm, and more preferably in a range from 50 to 300 mm.

The cover layer in the present invention may be any resin sheet having a transmittance of the laser light used for recording and replaying of 80% or more and a surface roughness of 5 nm or less. Examples of the material therefor include polycarbonate (PUREACE produced by Teijin Ltd. and PANLITE produced by Teijin Chemicals Ltd.), cellulose triacetate (FUJI TACK produced by Fuji Photo Film Co., Ltd.) and PET (LUMIRROR produced by Toray Industries, Inc.). Among these, polycarbonate and cellulose triacetate are preferably used.

The cover layer is adhered to the recording layer with an adhesive. The adhesive is selected in consideration of the adhesion strength and workability, and a radiation-curable adhesive is preferably used. Examples of the radiation-curable adhesive include electron beam-curable adhesives and ultraviolet ray-curable adhesives.

The radiation-curable adhesive contains a monomer or a resin having two or more radiation-sensitive double bonds in the molecule, and examples thereof include an acrylate, an acrylamide, a methacrylate, a methacrylamide, an allyl compound, a vinyl ether and a vinyl ester. Preferred examples thereof include an at least bi-functional acrylate compound and an at least bi-functional methacrylate compound.

Specific examples of the at least bi-functional (meth) acrylate compound that can be used in the present invention include compounds formed by adding acrylic acid or methacrylic acid to an aliphatic diol, such as ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate and tripropylene glycol dimethacrylate.

A polyether acrylate or polyether methacrylate formed by adding acrylic acid or methacrylic acid to a polyether polyol, such as polyethylene glycol, polypropylene glycol or polytetramethylene glycol, or a polyester acrylate or polyester methacrylate formed by adding acrylic acid or methacrylic acid to a known polyester polyol obtained from a dibasic acid and glycol can also be used.

A polyurethane acrylate or polyurethane methacrylate formed by adding acrylic acid or methacrylic acid to a known polyurethane formed from a polyol and a polyisocyanate can be used.

A compound obtained by adding acrylic acid or methacrylic acid to bisphenol A, bisphenol F, hydrogenated bisphenol A, hydrogenated bisphenol F or an alkyleneoxide adduct thereof, or a compound having a cyclic structure, such as isocyanuric oxide alkylene oxide-modified diacrylate, isocyanuric acid alkylene oxide-modified dimethacrylate, tricyclodecane dimethanol diacrylate or tricyclodecane dimethanol dimethacrylate, can also be used.

In the case where an ultraviolet ray-curable adhesive is used as the radiation-curable adhesive, a photopolymerization initiator is necessarily added to the polymerizable monomer and the resin. Known photopolymerization initiators can be used therefor, and among these, an aromatic ketone compound is preferred. The aromatic ketone compound is not particularly limited, and those having relatively large extinction coefficients at wavelengths of 254, 313 and 365 nm, at which bright line spectra of a mercury lamp that is generally used as an ultraviolet ray irradiation light source are preferable. Representative examples thereof include acetophenone, benzophenone, benzoin ethyl ether, benzyl methyl ketal, benzyl ethyl ketal, benzoin isobutyl ketone, hydroxydimethyl phenyl ketone, 1-hydroxycyclohexyl phenyl ketone, 2,2-diethoxyacetophenone and Michler's ketone, and various other kinds of ketones may be used.

The mixing ratio of the aromatic ketone compound is generally from 0.5 to 20 parts by weight, preferably from 2 to 15 parts by weight, and more preferably from 3 to 10 parts by weight, per 100 parts by weight of the polymerizable monomer and the resin. An ultraviolet ray-curable adhesive having a photoinitiator mixed therein is commercially available and may be used in the present invention. A mercury lamp is used as the ultraviolet ray light source. A lamp of 20 to 200 W/cm is used as the mercury lamp at a rate of from 0.3 to 20 m/min. In general, the distance between the cover layer and the mercury lamp is preferably from 1 to 30 cm.

As an electron beam accelerator used for the electron beam-curable adhesive, a scanning system, a double scanning system and a curtain beam system can be employed, and a curtain beam system is preferably used because high output can be obtained at relatively low cost. The electron beam characteristics are: an accelerating voltage of from 100 to 1,000 kV, preferably from 150 to 300 kV; and an absorption dose of from 0.5 to 20 Mrad, preferably from 1 to 10 Mrad.

A method for coating the adhesive onto the recording layer is not particularly limited, but a spin coating method is preferred. The thickness of the adhesive layer is preferably about from 5 to 50 μm. The coating temperature of the adhesive may be in a range from 23 to 50° C. without any problem, and it is preferably from 24 to 40° C., and more preferably from 25 to 37° C.

An embodiment of the second aspect of the present invention will be described below.

The optical recording medium of the present invention includes a substrate having particular grooves and provided thereon a layer structure including a recording layer and a reflective layer in this order.

The substrate has grooves, particularly grooves in a spiral form, and the grooves have a track pitch of from 200 to 400 nm, a depth of from 50 to 150 nm and a half-value width of from 90 to 200 nm. The recording layer contains an organic substance having at least one maximum absorption peak in each of a range from 600 to 800 nm and a range from 300 to 400 nm.

The optical recording medium carries out recording and replaying by using laser light having a wavelength of 450 nm or less and an objective lens having an aperture (NA) of from 0.5 to 0.7.

The optical recording medium of the present invention is excellent in both the C/N and the reproducing durability and can carry out high density recording without any problem because of the particular organic substance recording layer provided on the substrate with the particular grooves formed therein.

According to the second aspect of the present invention, it is preferred that the optical recording medium (hereinafter sometimes referred to as a first optical disk), which has the substrate having provided thereon the recording layer and reflective layer, is adhered to a second disk having at least a substrate. The second disk may be either a single substrate layer or a substrate having a reflective layer provided thereon. The first and second disks may have a protective layer and a printed layer provided thereon. The first optical disk and the second disk are adhered with an adhesive.

The material of the substrate, the material of the recording layer, the method for forming the organic substance recording layer, the solvent for the coating composition of the organic substance layer, the binder, the concentration of the organic substance in the coating composition, the coating method and the like used in the optical recording medium according to the second aspect of the present invention may be the same as those described for the first aspect of the present invention.

The reflective layer formed in the optical recording medium according to the second aspect of the present invention may be formed with the same materials by the same methods as those described for the first aspect of the present invention. The thickness of the light-reflective layer is generally in a range from 10 to 800 nm, preferably in a range from 20 to 500 nm, and more preferably in a range from 50 to 300 nm.

An adhesive for adhering the first and second optical disks is selected in consideration of the adhesion strength and workability, and a radiation-curable adhesive is preferably used. Examples of the radiation-curable adhesive include electron beam-curable adhesives and ultraviolet ray-curable adhesives.

The radiation-curable adhesive and the photopolymerization initiator may be the same as those described for the first aspect of the present invention.

The electron beam accelerator used for the radiation-curable adhesive and the like may also be the same as those described for the first aspect of the present invention.

An embodiment of the third aspect of the present invention will be described in detail below.

The optical information recording medium of the present invention is an optical information recording medium including a substrate having thereon a recording layer capable of carrying out recording of information by irradiation with laser light having a wavelength of from 380 to 500 nm through a lens having an aperture (NA) of 0.7 or more. A reflective layer is provided on the substrate, the recording layer is provided on the reflective layer, and a sheet layer is provided on the recording layer. The recording layer is a layer containing an organic substance, and the substrate has grooves with a depth of from 15 to 45 nm, a track pitch of from 250 to 400 nm, a half-value width of from 60 to 200 nm and a tilt angle of from 40 to 80°.

Organic Substance Recording Layer

The recording layer of the optical information recording medium includes a layer of an organic substance (which is also referred to as an organic coloring material). Laser light having a wavelength of from 380 to 500 nm is condensed by passing through a lens having an NA (aperture) of 0.7 or more, and the recording layer is irradiated therewith at the position of a focal point, whereby the temperature of the irradiated part of the organic substance layer is locally increased by absorbing the light, and the optical characteristics of that part are changed by a physical or chemical change (such as formation of a pit) to attain recording of information. Reading of information (replaying) is generally carried out by irradiation of the optical disk with laser light of the same wavelength as the laser light for recording, and a difference in reflectivity between parts of the recording layer having the changed optical characteristics (recorded part) and parts having the unchanged optical characteristics (unrecorded part) is detected to attain replaying.

It is preferred that the organic substance constituting the recording layer of the present invention contains a phthalocyanine derivative and/or a benzotriazole derivative, because a recording medium of large capacity and high density can then be obtained.

Phthalocyanine Denvative

The phthalocyanine derivative used in the organic substance recording layer of the medium is preferably a compound represented by the following general formula (I).

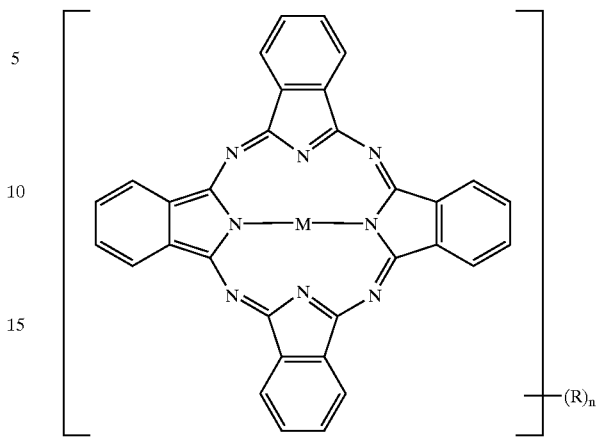

General Formula (I)

In the general formula (I), R represents a substituent and n represents an integer from 1 to 8. If n is 2 or more, the plurality of groups represented by R may be the same as each other or different from each other. M represents two hydrogen atoms, a metal, a metallic oxide or a metal having a ligand.

In the general formula (I), preferred examples of the groups represented by R include an alkyl group having from 1 to 20 carbon atoms, an aryl group having from 6 to 14 carbon atoms, an aralkyl group having from 7 to 15 carbon atoms, a heterocyclic group having from 1 to 10 carbon atoms, an alkoxy group having from 1 to 20 carbon atoms, an aryloxy group having from 6 to 14 carbon atoms, an acyl group having from 2 to 21 carbon atoms, a sulfonyl group having from 2 to 21 carbon atoms, a carbamoyl group having from 1 to 25 carbon atoms, a sulfamoyl group having from 0 to 32 carbon atoms, an alkoxycarbonyl group having from 1 to 20 carbon atoms, an aryloxycarbonyl group having from 7 to 15 carbon atoms, an acylamino group having from 2 to 21 carbon atoms, a sulfonylamino group having from 1 to 20 carbon atoms and a halogen atom. More preferred examples among these include an alkyl group having from 3 to 16 carbon atoms, an aryl group having from 6 to 10 carbon atoms, an alkoxy group having from 3 to 16 carbon atoms, an aryloxy group having from 6 to 10 carbon atoms, a sulfonyl group having from 3 to 16 carbon atoms and a sulfamoyl group having from 2 to 20 carbon atoms, and further preferred examples include an alkoxy group having from 4 to 12 carbon atoms, a sulfonyl group having from 4 to 12 carbon atoms and a sulfamoyl group having from 4 to 16 carbon atoms, with a sulfamoyl group having from 6 to 12 carbon atoms being particularly preferred.

In the general formula (I), the substituent represented by R may further have a substituent, and examples of this substituent include the following.

Examples of this substituent include a linear or cyclic alkyl group having from 1 to 20 carbon atoms (such as methyl, ethyl, isopropyl and cyclohexyl), an aryl group having from 6 to 18 carbon atoms (such as phenyl, chlorophenyl, 2,4-di-t-amylphenyl and 1-naphtyl), an aralkyl group having from 7 to 18 carbon atoms (such as benzyl and anisyl), an alkenyl group having from 2 to 20 carbon atoms (such as vinyl and 2-methylvinyl), an alkynyl group having from 2 to 20 carbon atoms (such as ethynyl, 2-methylethynyl and 2-phenylethynyl), a halogen atom (such as F, Cl, Br and I), a cyano group, a hydroxyl group, a carboxyl group, an acyl group having from 2 to 20 carbon atoms (such as acetyl, benzoyl, salicyloyl and pivaloyl), an alkoxy group having from 1 to 20 carbon atoms (such as methoxy, butoxy and cyclohexyloxy), an aryloxy group having from 6 to 20 carbon atoms (such as phenoxy, 1-naphthoxy and toluoyl), an alkylthio group having from 1 to 20 carbon atoms (such as methylthio, butylthio, benzylthio and 3-methoxypropylthio), an arylthio group having from 6 to 20 carbon atoms (such as phenylthio and 4-chlorophenylthio), an alkylsulfonyl group having from 1 to 20 carbon atoms (such as methanesulfonyl and butanesulfonyl), an arylsulfonyl group having from 6 to 20 carbon atoms (such as benzenesulfonyl and p-toluenesulfonyl), a carbamoyl group having from 1 to 17 carbon atoms (such as unsubstituted carbamoyl, methylcarbamoyl, ethylcarbamoyl, n-butylcarbamoyl and dimethylcarbamoyl), an amide group having from 1 to 16 carbon atoms (such as acetamide and benzamide), an acyloxy group having from 2 to 10 carbon atoms (such as acetoxy and benzoyloxy), an alkoxycarbonyl group having from 2 to 10 carbon atoms (such as methoxycarbonyl and ethoxycarbonyl), and a 5- or 6-membered heterocyclic group (such as an aromatic heterocyclic ring, e.g., pyridyl, thienyl, furil, thiazolyl, imidazolyl and pyrazolyl, a pyrrolidine ring, a piperidine ring, a morpholine ring, a pyran ring, a thiopyran ring, a dioxane ring and a dithiolan ring).

Preferred examples of the substituent on the substituent represented by R in the general formula (I) include a linear or cyclic alkyl group having from 1 to 16 carbon atoms, an aryl group having from 6 to 14 carbon atoms, an aralkyl group having from 7 to 15 carbon atoms, an alkoxy group having from 1 to 16 carbon atoms, an aryloxy group having from 6 to 14 carbon atoms, a halogen atom, an alkoxycarbonyl group having from 2 to 17 carbon atoms, a carbamoyl group having from 1 to 10 carbon atoms and an amide group having from 1 to 10 carbon atoms, and among these, more preferred examples include a linear or cyclic alkyl group having from 1 to 10 carbon atoms, an aralkyl group having from 7 to 13 carbon atoms, an aryl group having from 6 to 10 carbon atoms, an alkoxy group having from 1 to 10 carbon atoms, an aryloxy group having from 6 to 10 carbon atoms, a chlorine atom, an alkoxycarbonyl group having from 2 to 11 carbon atoms, a carbamoyl group having from 1 to 7 carbon atoms and an amide group having from 1 to 8 carbon atoms. A linear or cyclic alkyl group having from 3 to 10 carbon atoms, an aralkyl group having from 7 to 11 carbon atoms, an alkoxy group having from 1 to 8 carbon atoms, an alkoxycarbonyl group having from 3 to 9 carbon atoms, a phenyl group and a chlorine atom are particularly preferred.

In the general formula (I), n is preferably from 2 to 6, more preferably 3 or 4, and particularly preferably 4. When n is an integer of 2 or more, plural groups represented by R may be the same as each other or different from each other, and are preferably the same as each other. In the general formula (I), M is preferably a metal, and copper, nickel and palladium are more preferred. Among these, copper and nickel are further preferred, and copper is particularly preferred.

The compound represented by the general formula (I) may form a multimer through bonds at arbitrary positions, and the plural units of the multimer may be the same as each other or different from each other and may be bonded to a polymer chain, such as polystyrene, polymethyl methacrylate, polyvinyl alcohol or cellulose.

The phthalocyanine derivative represented by the general formula (I) used in the medium may be used singly as a particular derivative or may be used as a mixture of plural kinds thereof having structures different from each other, and is preferably used singly. There are some cases where the phthalocyanine derivative represented by the general formula (I) unavoidably contains substitutional position isomers of the substituent represented by R upon synthesis thereof, but the substitutional position isomers need not be distinguished from each other and can be considered as the same derivative. Furthermore, in the case where isomers with respect to the substituent represented by R are contained, they need not be distinguished from each other and can be considered as the same phthalocyanine derivative. Accordingly, cases where the structures are different from each other mean that, in the general formula (I), the species or numbers of the constitutional atoms of the substituent represented by R are different, or the integer represented by n is different.

Preferred specific examples of the phthalocyanine derivative used in the present invention are shown in Table 1 below, but the present invention is not limited thereto. The numerals of the substituent position of the substituent represented by R in the phthalocyanine derivative are shown in the formula below.

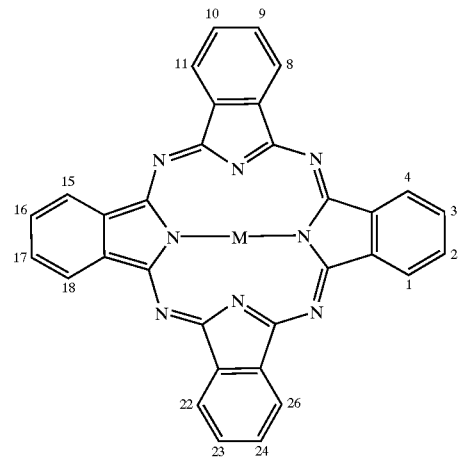

TABLE 1

Specific Examples of Phthalocyanine Derivatives used in the present invention

| No. | Substitution position - R | M |
|---|---|---|
| (I-1) | 2,9,16,23-SO$_2$N(i-C$_4$H$_9$-i)$_2$ | Cu |
| (I-2) | 2,9,16,23-SO$_2$NH-(2-butoxyphenyl) | Cu |
| (I-3) | 2,9,16,23-SO$_2$NH(CH$_2$)$_3$O-(2,4-di-t-amylphenyl) | Cu |
| (I-4) | 2,9,16,23-SO$_2$N-(2-ethoxyethyl)$_2$ | Ni |
| (I-5) | 2,9,16,23-SO$_2$N-(cyclohexyl)$_2$ | Ni |
| (I-6) | 2,9,16,23-SO$_2$N(phenyl)$_2$ | Ni |
| (I-7) | 2,9,16,23-SO$_2$NH(2-i-propyloxycarbonylphenyl) | Pd |
| (I-8) | 2,9,16,23-SO$_2$NH(2,6-di-i-propylphenyl) | Pd |
| (I-9) | 2,9,16,23-SO$_2$-(4-morpholinyl) | Co |
| (I-10) | 2,9,16,23-SO$_2$NMe-(3-chlorophenyl) | Fe |
| (I-11) | 2,9,16-SO$_2$N(CH$_2$)$_3$NMe$_2$ | Cu |
| (I-12) | 2,9,16,23-SO$_2$-(2 -butoxyphenyl) | Cu |
| (I-13) | 2,9,16,23-SO$_2$-(2-ethoxy-5-t-butyl) | Ni |
| (I-14) | 2,9,16,23-SO$_2$-(2-ethoxycarbonylphenyl) | Co |
| (I-15) | 2,9,16,23-SO$_2$(CH$_2$)$_4$-(2,4-di-t-amylphenoxy) | Cu |
| (I-16) | 2,9,16,23-SO$_2$(CH$_2$)$_2$OEt | Pd |
| (I-17) | 2,9,16,23-SO$_2$(cyclohexyl) | Cu |
| (I-18) | 2,9,16,23-SO$_2$-(4-i-butyrylaminophenyl) | Ni |
| (I-19) | 2,9,16-SO$_2$-(3,5-dichlorophenyl) | Pd |
| (I-20) | 2,9,16-SO$_2$CH$_2$CO$_2$—CH$_2$CH(Et)C$_4$H$_9$ | Mg |
| (I-21) | 3,10,17,24-Me2,9,16,23-SO$_2$-(2-methoxyphenyl) | Zn |

TABLE 1-continued

Specific Examples of Phthalocyanine Derivatives used in the present invention

| No. | Substitution position - R | M |
| --- | --- | --- |
| (I-22) | 1,8,15,22-SO$_2$N(C$_5$H$_7$)$_2$ | Cu |
| (I-23) | 1,8,15,22-OCH(CHMe$_2$)$_2$ | Ni |
| (I-24) | 1,8,15,22-OCHMe(phenyl) | Zn |
| (I-25) | 1,4,8,11,15,18,22,26-i-propyloxy | Cu |
| (I-26) | 2,3,9,10,16,17,23,24-(2-methoxyethoxy) | SiCl$_2$ |
| (I-27) | 2,9,16,23-t-amyl | Ni |
| (I-28) | 2,9,16,23-(2,6-di-methoxyphenyl) | Zn |
| (I-29) | 1,8,15,22-(1-naphtyl) | Pd |
| (I-30) | 2,9,16,23-cumyl | Cu |
| (I-31) | 2,9,16,23-(4-cumylphenoxy) | Co |
| (I-32) | 1,8,15,22-s-butoxy2,9,16,23-Cl | Pd |

The phthalocyanine derivative used in the present invention can be synthesized by methods described or cited by Shirai and Kobayashi, "Phthalocyanines—chemistry and function", pp. 1 to 62 (published by IPC) and C. C. Lenznoff and A. B. P. Lever, "Phthalocyanines—Properties and Applications", pp. 1 to 54 (published by VCH), and analogous methods.

Benzotriazole Denvative

The benzotriazole derivative used in the organic substance recording layer of the medium is preferably a compound represented by the following general formula (II).

General Formula (II)

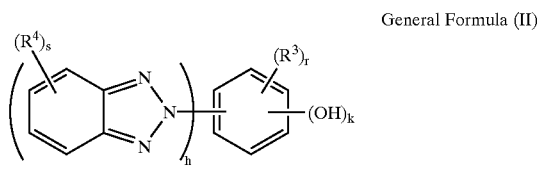

In the general formula (II), h and k each independently represents an integer from 1 to 3, $R^3$ and $R^4$ each represents a substituent, and r and s each represents an integer from 0 to 3. If h=1 and r≠0, $R^3$ and $R^4$ represent substituents selected from the group consisting of an alkyl group having from 2 to 16 carbon atoms, an aryl group having from 6 to 14 carbon atoms, an aralkyl group having from 7 to 15 carbon atoms, an alkoxy group having from 1 to 16 carbon atoms, an aryloxy group having from 6 to 14 carbon atoms, an alkoxycarbonyl group having from 2 to 17 carbon atoms, a carbamoyl group having from 1 to 10 carbon atoms, an amide group having from 1 to 10 carbon atoms, an acyloxy group having from 2 to 17 carbon atoms and a halogen atom.

The benzotriazole derivative represented by the general formula (II) is a compound in which a benzene ring is substituted by at least a hydroxyl group and the nitrogen atom at the 2-position of a 1,2,3-benzotriazolyl group.

In the general formula (II), h represents the number of 1,2,3-benzotriazolyl groups, and h is an integer from 1 to 3, preferably 1 or 2, and particularly preferably 1. The symbol k represents the number of hydroxyl groups, and k is an integer from 1 to 3, preferably 1 or 2, and particularly preferably 1. It is preferred that the 1,2,3-benzotriazolyl group and the hydroxyl group are substituted to adjacent positions of the benzene ring.

In the general formula (II), $R^3$ is a substituent on the benzene ring, and $R^4$ is a substituent on the 1,2,3-benzotriazolyl ring. The symbol r represents the number of substituents represented by $R^3$, and r is an integer from 0 to 3, preferably 1 or 2, and particularly preferably 1. The symbol s represents the number of substituents represented by $R^4$, and s is an integer from 0 to 3, preferably 0 or 1, and particularly preferably 0. In other words, it is preferred that the benzene ring substituted with a hydroxyl group has another substituent, and it is also preferred that the 1,2,3-benzotriazolyl ring is unsubstituted.

In the general formula (II), examples of the substituents represented by $R^3$ and $R^4$ include the following.

Examples of the substituents include a linear or cyclic alkyl group having from 1 to 20 carbon atoms (such as methyl, ethyl, isopropyl and cyclohexyl), an aryl group having from 6 to 18 carbon atoms (such as phenyl, chlorophenyl, 2,4-di-t-amylphenyl and 1-naphtyl), an aralkyl group having from 7 to 18 carbon atoms (such as benzyl and anisyl), an alkenyl group having from 2 to 20 carbon atoms (such as vinyl and 2-methylvinyl), an alkynyl group having from 2 to 20 carbon atoms (such as ethynyl, 2-methylethynyl and 2-phenylethynyl), a halogen atom (such as F, Cl, Br and I), a cyano group, a hydroxyl group, a carboxyl group, an acyl group having from 2 to 20 carbon atoms (such as acetyl, benzoyl, salicyloyl and pivaloyl), an alkoxy group having from 1 to 20 carbon atoms (such as methoxy, butoxy and cyclohexyloxy), an aryloxy group having from 6 to 20 carbon atoms (such as phenoxy, 1-naphthoxy and toluoyl), an alkylthio group having from 1 to 20 carbon atoms (such as methylthio, butylthio, benzylthio and 3-methoxypropylthio), an arylthio group having from 6 to 20 carbon atoms (such as phenylthio and 4-chlorophenylthio), an alkylsulfonyl group having from 1 to 20 carbon atoms (such as methanesulfonyl and butanesulfonyl), an arylsulfonyl group having from 6 to 20 carbon atoms (such as benzenesulfonyl and p-toluenesulfonyl), a carbamoyl group having from 1 to 17 carbon atoms (such as unsubstituted carbamoyl, methylcarbamoyl, ethylcarbamoyl, n-butylcarbamoyl and dimethylcarbamoyl), an amide group having from 1 to 16 carbon atoms (such as acetamide and benzamide), an acyloxy group having from 2 to 20 carbon atoms (such as acetoxy and benzoyloxy), an alkoxycarbonyl group having from 2 to 20 carbon atoms (such as methoxycarbonyl and ethoxycarbonyl), and a 5- or 6-membered heterocyclic group (such as an aromatic heterocyclic ring, e.g., pyridyl, thienyl, furil, thiazolyl, imidazolyl and pyrazolyl, a pyrrolidine ring, a piperidine ring, a morpholine ring, a pyran ring, a thiopyran ring, a dioxane ring and a dithiolan ring). Groups derived from 1,3-dimethyl barbituric acid are not included in examples of a substituent represented by $R^3$ or $R^4$.

Preferred examples of the substituent represented by $R^3$ or $R^4$ include a linear or cyclic alkyl group having from 2 to 16 carbon atoms, an aryl group having from 6 to 14 carbon atoms, an aralkyl group having from 7 to 15 carbon atoms, an alkoxy group having from 1 to 16 carbon atoms, an aryloxy group having from 6 to 14 carbon atoms, a halogen atom, an alkoxycarbonyl group having from 2 to 17 carbon atoms, a carbamoyl group having from 1 to 10 carbon atoms and an amide group having from 1 to 10 carbon atoms, and among these, more preferred examples include a linear or cyclic alkyl group having from 2 to 10 carbon atoms, an aralkyl group having from 7 to 13 carbon atoms, an aryl group having from 6 to 10 carbon atoms, an alkoxy group having from 2 to 10 carbon atoms, an acyloxy group having from 2 to 17 carbon atoms, an aryloxy group having from 6 to 10 carbon atoms, a chlorine atom, an alkoxycarbonyl group having from 2 to 11 carbon atoms, a carbamoyl group having from 2 to 7 carbon atoms and an amide group having from 2 to 8 carbon atoms, with a linear or cyclic alkyl group having from 3 to 10 carbon atoms, an aralkyl group having from 7 to 11 carbon atoms, an alkoxy group having from 2 to 8 carbon atoms, an alkoxycarbonyl group having from 3 to 9 carbon atoms, a phenyl group and a chlorine atom being particularly preferred.

When h=1 and r≠0 the substituent represented by $R^3$ is particularly preferably an alkyl group having from 2 to 16 carbon atoms, an aryl group having from 6 to 14 carbon atoms, an aralkyl group having from 7 to 15 carbon atoms, an alkoxy group having from 1 to 16 carbon atoms, an aryloxy group having from 6 to 14 carbon atoms, an alkoxycarbonyl group having from 2 to 17 carbon atoms, a carbamoyl group having from 1 to 10 carbon atoms, an amide group having from 1 to 10 carbon atoms, an acyloxy group having from 2 to 17 carbon atoms or a halogen atom.

The substituent represented by $R^3$ or $R^4$ may further have a substituent and, in this case, examples of the substituent include those groups exemplified for the substituent represented by $R^3$ or $R^4$. $R^3$ may be a divalent or trivalent linking group and may be substituted on plural benzene rings. The plural benzene rings substituted by the group represented by $R^3$ may be further substituted with different substituents.

The compound represented by the general formula (II) may form a multimer through direct or indirect bonding at arbitrary positions, and the plural units of the multimer may be the same as each other or different from each other. The cases where a multimer is formed by indirect bonding at arbitrary positions include the case where the units are bonded by the substituent represented by $R^3$ or $R^4$ as a linking group. The units may be bonded to a polymer chain, such as polystyrene, polymethacrylate, polyvinyl alcohol or cellulose.

Preferred specific examples of the benzotriazole compound used in the present invention will be shown below, but the present invention is not limited thereto.

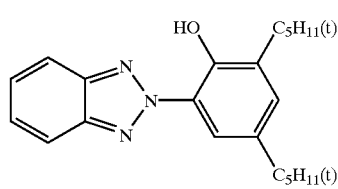

(1)

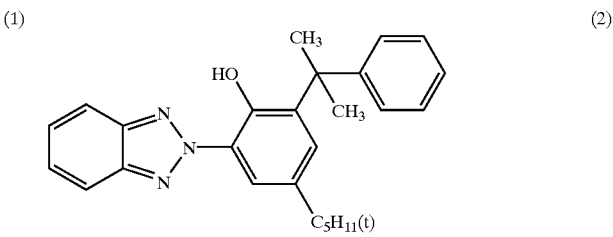

(2)

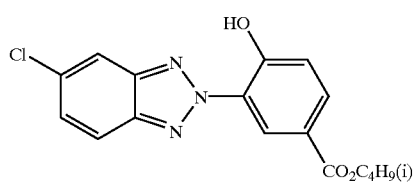

(3)

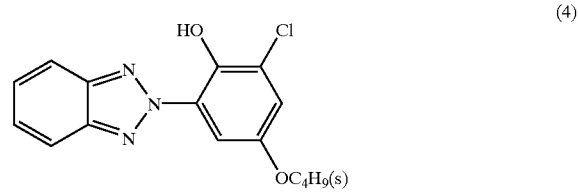

(4)

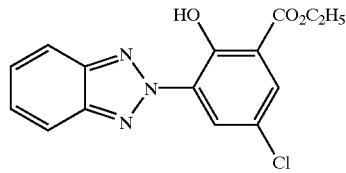

(5)

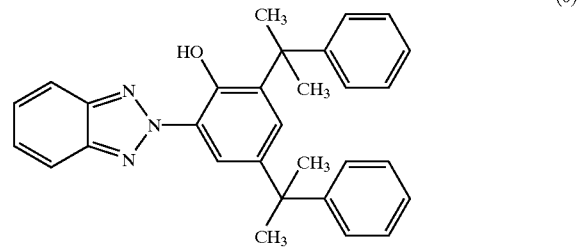

(6)

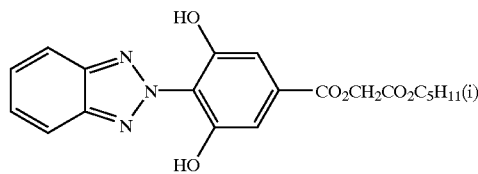

(7)

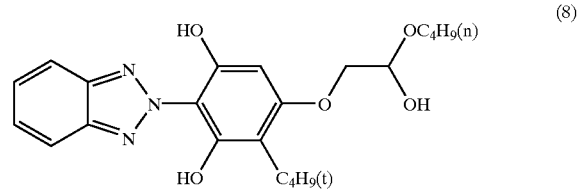

(8)

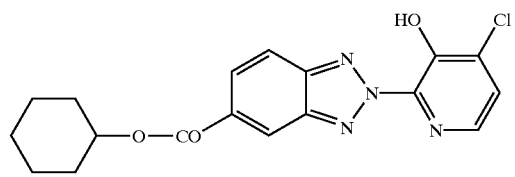

(9)

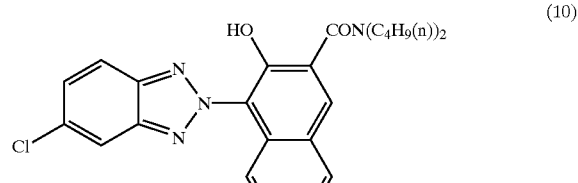

(10)

-continued
(11)
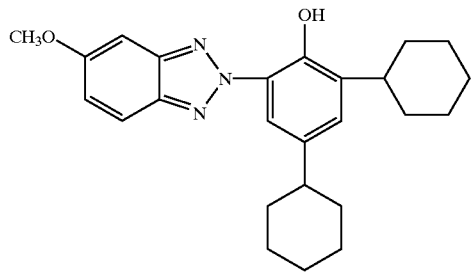
(12)
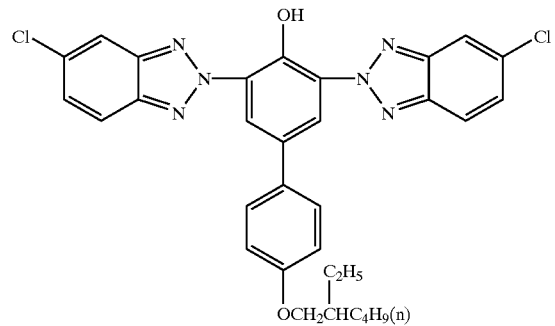
(13)
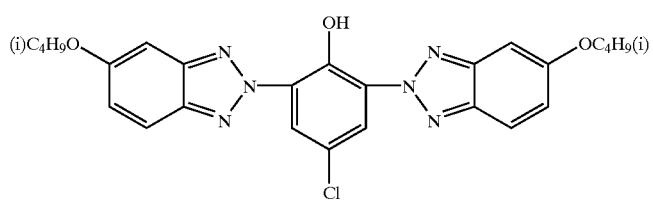
(14)
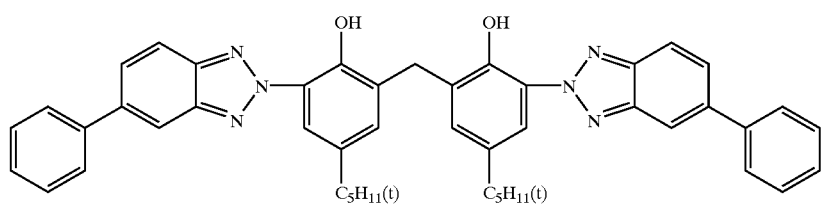
(15)
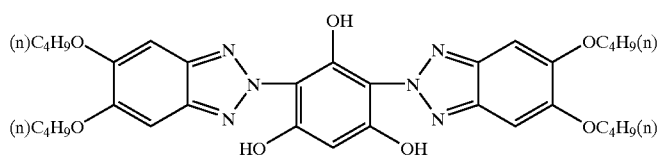
(16)
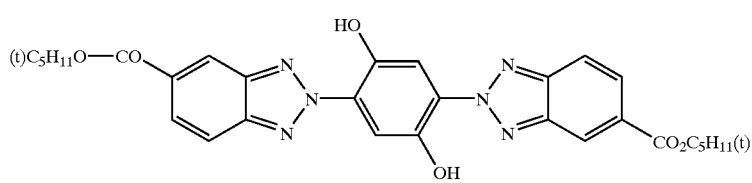
(17)
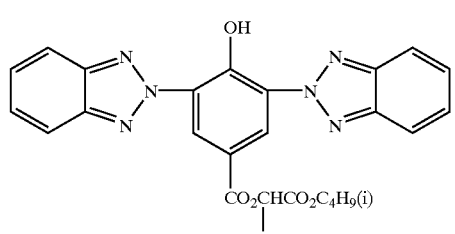
(18)
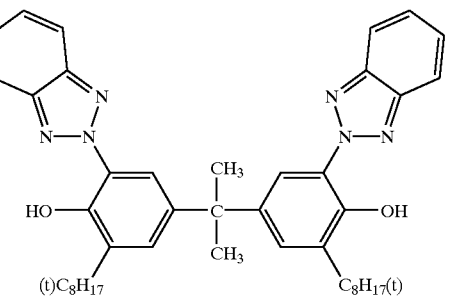
(19)
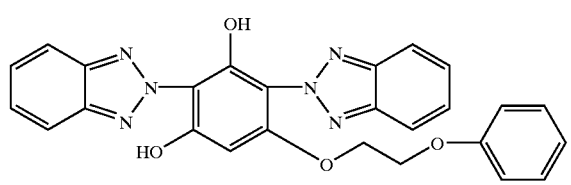

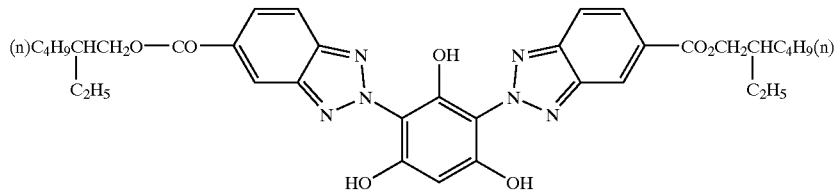
(20)
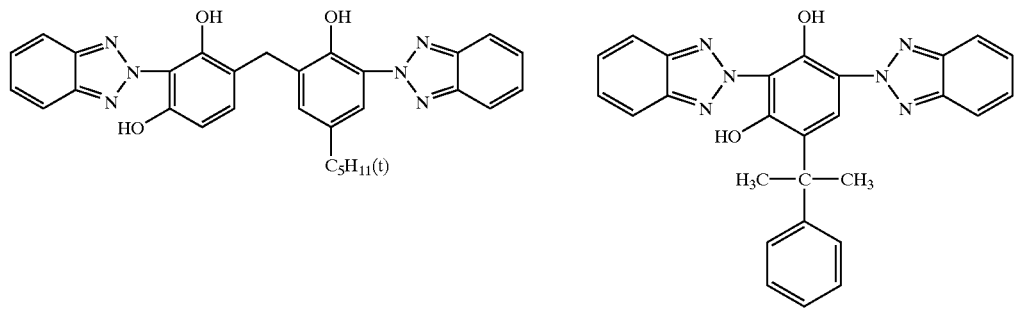
(21) (22)
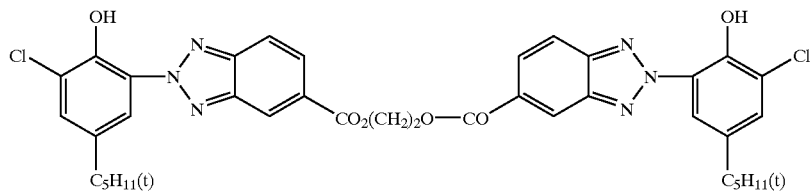
(23)
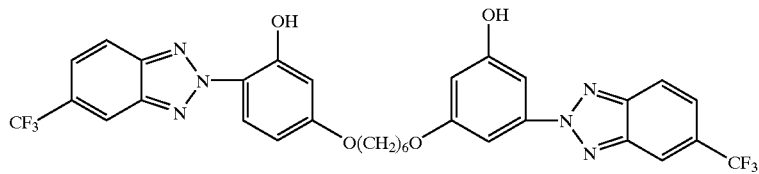
(24)
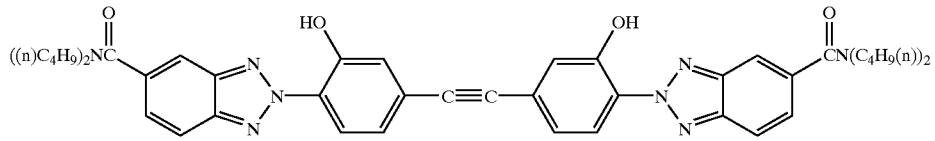
(25)
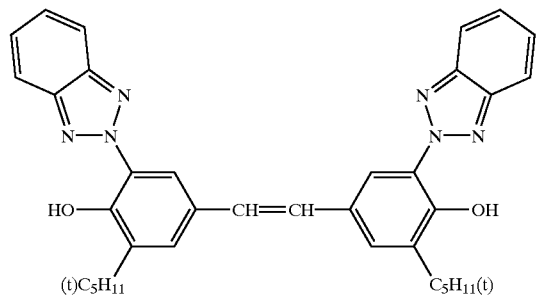
(26)

-continued
(27)
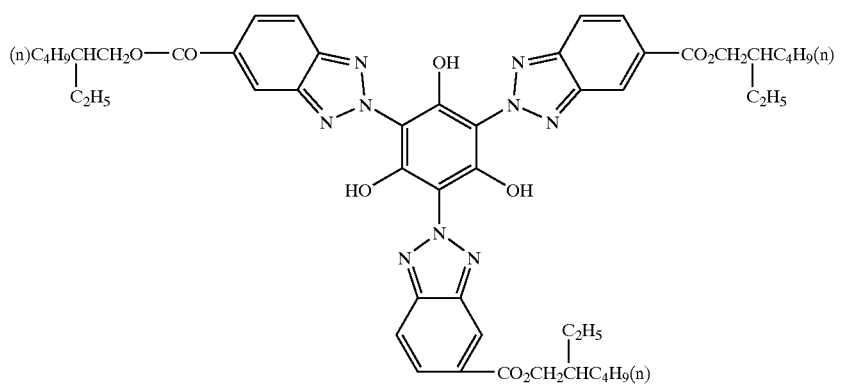
(28)
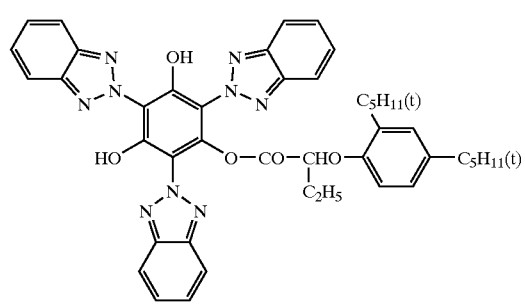
(29)
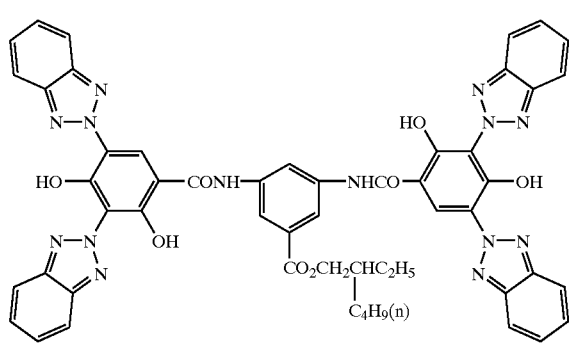
(30)
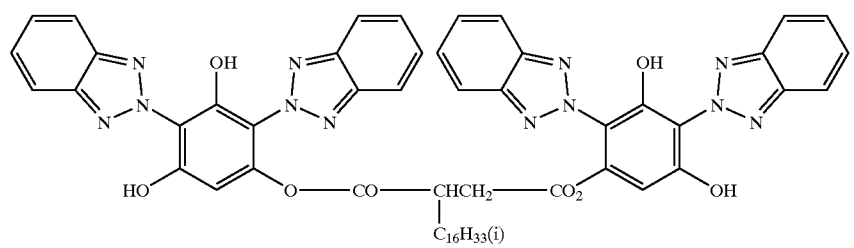
(31)
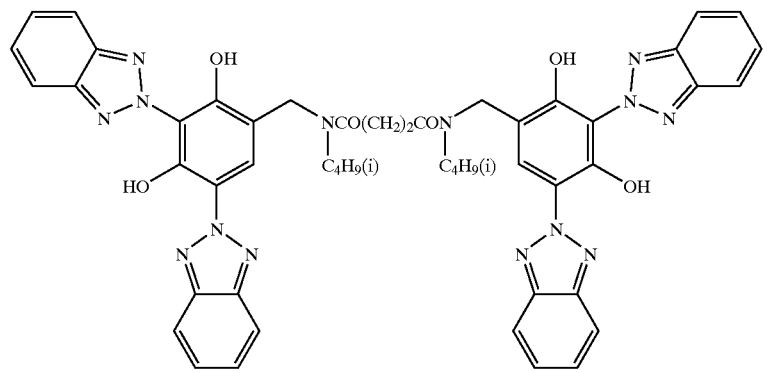
(32)
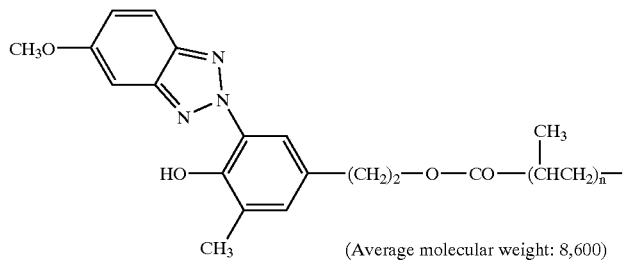
(Average molecular weight: 8,600)

The benzotriazole compound used in the present invention can be synthesized by methods described or cited in JP-B No. 54-41038, No. 60-14062, No. 2-33709, Japanese Patent No. 2,858,940, No. 2,864468, British Patent No. 1,239,258, U.S. Pat. No. 4,587,346, Polymer, vol. 126, p. 1288 (1985), and Monatsh. Chem., vol. 112, p. 1279 (1981), and analogous methods. Benzotriazole compounds commercially available as stabilizers for coating compositions and polymers may be used.

The benzotriazole compound may be used singly or may be used in a combination of two or more kinds thereof. The benzotriazole compound may be used in combination with another organic compound as the recording substance. Examples of the organic compound that can be used in combination include a cyanine organic substance, an oxonol organic substance, an azo metallic complex, a phthalocyanine organic substance, a pyrylium organic substance, a thiopyrylium organic substance, an azurenium organic substance, a squarylium organic substance, a naphthoquinone organic substance, a triphenylmethane organic substance and a triallylmethane organic substance.

Substrate of Recording Medium

The medium is constituted with a substrate having thereon a reflective layer having thereon a recording layer having thereon a sheet layer. The substrate has a groove depth of (a in FIG. 1) of from 15 to 45 nm, a track pitch (b in FIG. 1) of from 250 to 400 nm, a half-value width of grooves (c in FIG. 1) of from 60 to 200 nm and a tilt angle (d in FIG. 1) of the grooves of from 40 to 80°. There are no particular limitations other than these. Thus, the present invention can be applied to various kinds of constitutions of optical information recording media. The half-value width of the grooves (d) herein means a width of the groove at half the depth of the groove.

Owing to the foregoing constitution, the medium has a recording capacity and a recording density that are further increased, while basic performances as a recording medium, such as sensitivity and reflectivity, are maintained at a high level.

The substrate of the medium can be arbitrarily selected from various kinds of materials that are used as substrates of conventional optical information recording media. Examples of the material of the substrate include glass, polycarbonate, acrylic resin, such as polymethyl methacrylate, vinyl chloride resin, such as polyvinyl chloride and a vinyl chloride copolymer, epoxy resin, amorphous polyolefin and polyester, and these may be used singly or in combination depending on necessity. These materials can be used in the form of a film or of a plate having rigidity. Among these materials, use of a polycarbonate resin is preferred from the standpoint of moisture resistance, dimensional stability and economy.

In order to increase the recording density, the medium uses a substrate having grooves with a track pitch of from 250 to 400 nm, which is smaller than in CD-Rs and DVD-Rs. The track pitch of the substrate is preferably in a range from 260 to 380 nm, and most preferably in a range from 280 to 350 nm. If the track pitch is less than 250 nm, a desired sensitivity (C/N) cannot be obtained, and if it exceeds 400 nm, high density and large capacity cannot be attained.

In the medium, the half-value width of the groove of the substrate is in a range from 60 to 200 nm. The half-value width of the grooves of the substrate is preferably in a range from 80 to 200 nm, and most preferably in a range from 80 to 150 nm. If the half-value width of the groove is less than 60 nm or more than 200 nm, the output of the groove signal will be too small to attain desired tracking.

In the medium, the depth of the grooves of the substrate is in a range from 15 to 45 nm. The depth of the grooves of the substrate is preferably in a range from 15 to 40 nm, and most preferably in a range from 20 to 40 nm. If the depth of the grooves is less than 15 nm, the tracking signal will be too small to function for desired tracking, due to a too small phase contrast. If the depth of the grooves exceeds 45 nm on the other hand, the reflectivity will be small in relation to the phase contrast, decreasing the sensitivity (C/N), whereby accurate replaying cannot be carried out.

In the medium, the tilt angle of the grooves of the substrate is in a range from 40 to 80°. The tilt angle of the grooves is preferably in a range from 50 to 80°, and most preferably in a range from 60 to 80°. If the tilt angle of the grooves is less than 40°, the reflectivity will be small in relation to the phase contrast, decreasing the sensitivity (C/N), whereby accurate replaying cannot be carried out. If the tilt angle exceeds 80° on the other hand, the substrate will be difficult to release from a metallic mold upon molding, and thus defects like clouding will be formed in the grooves, decreasing the sensitivity (C/N), whereby accurate replaying cannot be carried out.

The medium preferably satisfies the following inequality in order to attain high capacity and high density while maintaining performance as a recording medium.

$$c+(a/2)\times\tan(d)<b/2$$

wherein a (nm) represents the depth, b (nm) represents the track pitch, c (nm) represents the half-value width, and d (°) represents the tilt angle of the grooves of the substrate.

An undercoating layer may be formed on the surface of the substrate on which the reflective layer is to be provided, for such objects as improvement of flatness, improvement of adhesion strength, and prevention of degradation of the reflective layer and the recording layer. Examples of a material of the undercoating layer include a polymer substance, such as polymethyl methacrylate, an acrylic acid-methacrylic acid copolymer, a styrene-maleic anhydride copolymer, polyvinyl alcohol, N-methylolacrylamide, a styrene-vinyltoluene copolymer, chlorosulfonated polyethylene, cellulose nitrate, polyvinyl chloride, chlorinated polyolefin, polyester, polyimide, a vinyl acetate-vinyl chloride copolymer, an ethylene-vinyl acetate copolymer, polyethylene, polypropylene and polycarbonate, and a surface modifying agent, such as a silane coupling agent. The undercoating layer of the present invention can be formed by dissolving or dispersing the foregoing material in a suitable solvent to prepare a coating composition, and coating the coating composition onto the surface of the substrate by a coating method such as a spin coating method, a dip coating method or an extrusion coating method. The thickness of the undercoating layer is generally in a range from 0.005 to 20 µm, and more preferably in a range from 0.01 to 10 µm.

Reflective Layer

In the medium, a reflective layer is provided above the substrate and under the organic substance recording layer, so as to improve the reflectivity upon replaying of information. A light-reflective substance as a material of the reflective layer may be any material that exhibits a reflectivity to laser light of 70% or more, and substances having a high reflectivity are preferred. Examples thereof include a metal or metalloid, such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and stainless steel.

These materials may be used singly or in combination, or as an alloy of two or more thereof. Among these, Cr, Ni, Pt, Cu, Ag, Au, Al and stainless steel are preferred. Metallic Au, metallic Ag, metallic Al and alloys thereof are particularly preferred, and metallic Ag, metallic Al and an alloy thereof are most preferred. The reflective layer of the present invention can be formed by forming the light-reflective material on the substrate or the recording layer through vapor deposition, sputtering or ion plating. The thickness of the reflective layer is generally in a range from 10 to 300 nm, and preferably in a range from 50 to 200 nm.

Formation of Recording Layer

In the medium, the recording layer containing the organic substance (the aforementioned organic substance constituting the recording layer) for recording optical information is provided on the reflective layer.

The formation of the organic substance recording layer can be carried out by vapor deposition, sputtering, CVD or coating with a solvent, and coating with a solvent is preferred. The coating temperature may be from 23 to 50° C. without any problem, and is preferably from 24 to 40° C., and more preferably from 25 to 37° C. In the case where the recording layer is formed by coating with a solvent, a quencher, a binder and the like are dissolved, depending on necessity, in the solvent in addition to the organic substance, such as the phthalocyanine derivative and the benzotriazole derivative, to prepare a coating composition, and the coating composition is coated on the surface of the substrate to form a coated film, which is then dried.

Examples of the solvent for the coating composition include an ester, such as butyl acetate, ethyl acetate and cellosolve acetate; a ketone, such as methyl ethyl ketone, cyclohexanone and methyl isobutyl ketone; a chlorinated hydrocarbon, such as dichloromethane, 1,2-dichloroethane and chloroform; an amide, such as dimethylformamide; a hydrocarbon, such as methylcyclohexane; an ether, such as dibutyl ether, diethyl ether, tetrahydrofuran and dioxane; an alcohol, such as ethanol, n-propanol, isopropanol, n-butanol and diacetone alcohol; a fluorine solvent, such as 2,2,3,3-tetrafluoropropanol; and a glycol ether, such as ethylene glycol monomethyl ether, ethylene glycol monoethyl ether, propylene glycol monomethyl ether. These solvents may be used singly or in a combination of two or more in consideration of the solubility of the organic substance used. Various kinds of additives, such as an antioxidant, a UV absorbent, a plasticizer and a lubricant, may be further added to the coating composition depending on necessity.

In the case where a binder is used in the organic substance recording layer, examples of the binder include a natural organic polymer substance, such as gelatin, a cellulose derivative, dextran, rosin and rubber; and a synthetic polymer, such as a hydrocarbon resin (e.g., polyethylene, polypropylene, polystyrene and polyisobutylene), a vinyl resin (e.g., polyvinyl chloride, polyvinylidene chloride and a polyvinyl chloride-polyvinyl acetate copolymer), an acrylic resin (e.g., polymethyl acrylate and polymethyl methacrylate), polyvinyl alcohol, chlorinated polyethylene, and an initial condensation product of a thermosetting resin (e.g., an epoxy resin, a butyral resin, a rubber derivative and a phenol-formaldehyde resin). In the case where the binder is used as a material for the recording layer, the usage amount of the binder is preferably in a range from 0.01 to 50 times by weight, and more preferably in a range from 0.1 to 5 times by weight, based on the amount of the organic substance. The concentration of the organic substance in the coating composition thus produced is generally in a range from 0.01 to 10% by weight, and preferably in a range from 0.1 to 5% by weight.

Examples of the coating method of the organic substance recording layer include a spraying method, a spin coating method, a dipping method, a roll coating method, a blade coating method, a doctor roll method and a screen printing method. The organic substance recording layer may be a single layer or may have a multilayer structure. The thickness of the organic substance recording layer is generally in a range from 20 to 500 nm, preferably in a range from 30 to 300 nm, and more preferably in a range from 50 to 100 nm.

In the organic substance recording layer of the present invention, various kinds of discoloration preventing agents may be added for improvement of the light resistance of the recording layer. As the discoloration preventing agent, a singlet oxygen quencher is generally used. As the singlet oxygen quencher, those described in known publications, such as patent publications, can be utilized. Specific examples thereof include those described in JP-A No. 58-175693, No. 59-81194, No. 60-18387, No. 60-19586, No. 60-19587, No. 60-35054, No. 60-36190, No. 60-36191, No. 60-44554, No. 60-44555, No. 60-44389, No. 60-44390, No. 60-54892, No. 60-47069, No. 63-209995, No. 4-25492, No. 1-38680, No. 6-26028, German Patent No. 350,399, and *J. of Chem. Soc. of Japan,* October 1992 issue, p. 1141. Preferred examples of the singlet oxygen quencher include compounds represented by the following general formula (III).

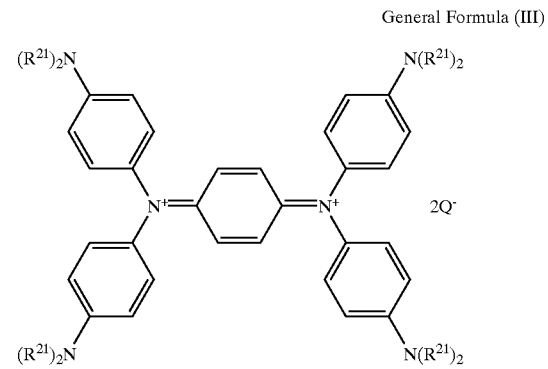

General Formula (III)

In the general formula (III), $R^{21}$ represents an alkyl group, which may have a substituent, and $Q^-$ represents an anion.

In the general formula (III), $R^{21}$ is generally an alkyl group having from 1 to 8 carbon atoms, which may have a substituent, and preferably an unsubstituted alkyl group having from 1 to 6 carbon atoms. Examples of the substituent on the alkyl group include a halogen atom (such as F and Cl), an alkoxy group (such as methoxy and ethoxy), an alkylthio group (such as methylthio and ethylthio), an acyl group (such as acetyl and propyonyl), an acyloxy group (such as acetoxy and propyonyloxy), a hydroxyl group, an alkoxycarbonyl group (such as methoxycarbonyl and ethoxycarbonyl), an alkenyl group (such as vinyl) and an aryl group (such as phenyl and naphthyl). Among these, a halogen atom, an alkoxy group, an alkylthio group and an alkoxycarbonyl group are preferred. Preferred examples of the anion represented by $Q^-$ include $ClO_4^-$, $AsF_6^-$, $BF_4^-$ and $SbF_6^-$.

Examples of the compounds represented by the general formula (III) are shown in Table 2.

TABLE 2

| Compound No. | $R^{21}$ | $Q^-$ |
|---|---|---|
| II-1 | $CH_3$ | $ClO_4^-$ |
| II-2 | $C_2H_5$ | $ClO_4^-$ |
| II-3 | $n\text{-}C_3H_7$ | $ClO_4^-$ |
| II-4 | $n\text{-}C_4H_9$ | $ClO_4^-$ |
| II-5 | $n\text{-}C_5H_{11}$ | $ClO_4^-$ |
| II-6 | $n\text{-}C_4H_9$ | $SbF_6^-$ |
| II-7 | $n\text{-}C_4H_9$ | $BF_4^-$ |
| II-8 | $n\text{-}C_4H_9$ | $AsF_6^-$ |

The usage amount of the discoloration preventing agent, such as the singlet oxygen quencher, is generally in a range from 0.1 to 50% by weight, preferably in a range from 0.5 to 45% by weight, further preferably in a range from 3 to 40% by weight, and particularly preferably in a range from 5 to 25%/by weight, based on the amount of the organic substance.

Sheet Layer

In the medium, a sheet layer is provided on the organic substance recording layer for physically and chemically protecting the recording layer and the like. The sheet layer may be formed with any material that has light transmittance, and examples of the material of the sheet layer used in the present invention include inorganic substances, such as SiO, $SiO_2$, $MgF_2$, $SnO_2$ and $Si_3N_4$, and organic substances, such as a thermoplastic resin, a thermosetting resin and a UV-curable resin. In particular, a thermoplastic resin, such as polycarbonate or cellulose triacetate, is preferred, and a thermoplastic resin exhibiting a moisture absorbing ratio of 5% or less in an environment with a temperature of 23° C. and a relative humidity of 50% is further preferred.

The sheet layer can be formed, for example, by laminating a film obtained by extrusion molding a plastic onto the reflective layer with an adhesive. Alternatively, it may be formed by other methods, such as vacuum deposition, sputtering and coating. In the case of the thermoplastic resin and the thermosetting resin, the layer may be formed by dissolving the resin in a suitable solvent to prepare a coating composition, and the coating composition is coated and dried. In the case of the UV-curable resin, the UV-curable resin is coated as is or after dissolving it in a suitable solvent to prepare a coating composition, and is then irradiated with UV light to achieve curing. In the coating compositions, various kinds of additives, such as an antistatic agent, an antioxidant and a UV absorbent, may be added depending on purpose. The thickness of the sheet layer is generally in a range from 0.1 μm to 1 mm. Through the foregoing process steps, a laminated body for the medium including the substrate having thereon the reflective layer, the recording layer and the sheet layer can be produced.

The sheet layer may be provided on the recording layer with an intermediate layer and an adhesive layer interposed therebetween. The intermediate layer is provided to improve the storage stability of the recording layer and to improve the adhesiveness between the recording layer and the thin film sheet layer. Examples of the material used in the intermediate layer include an inorganic substance, such as SiO, $SiO_2$, $MgF_2$, $SnO_2$ and $Si_3N_4$. The intermediate layer may be formed by vacuum deposition, such as vapor deposition or sputtering. In the adhesive layer, an adhesive containing a photocurable resin is preferably used. For example, the photocurable resin is coated on the intermediate layer as is or after dissolving it in a suitable solvent to prepare a coating composition. A resin film obtained by extrusion molding a plastic is laminated on the coated layer, and the laminated resin film is irradiated with light to cure the coated film, whereby the resin film is adhered on the intermediate layer to form a thin film sheet layer.

Information Recording Method

An information recording method applied to the present invention is carried out, for example, in the following manner using the optical information recording medium. The optical information recording medium is rotated at a constant linear velocity (from 1.2 to 1.4 m/sec for the CD format) or a constant angular velocity, and irradiated with light for recording including light at a wavelength of from 380 to 500 nm, such as semiconductor laser light, from the side of the substrate or from the side of the protective layer, through a lens having an NA (lens aperture) of 0.7 or more. Upon irradiation, the temperature of the irradiated part of the organic substance recording layer is increased locally by absorbing the light, and the temperature is locally increased, and the optical characteristics of that part are changed by a physical or chemical change (such as formation of a pit) to attain recording of information.

Examples of the laser light source having an oscillation wavelength in a range from 380 to 500 nm include a blue semiconductor laser having an oscillation wavelength in a range from 380 to 500 nm. The use of the blue semiconductor laser is particularly preferred from the standpoint of increase of the recording density.

Replaying of the information thus recorded can be carried out by rotating the optical information recording medium at the same constant linear velocity and irradiating with laser light from the side of the sheet, and light thus reflected is detected.

The medium includes, for example, a disk substrate having pregrooves having a constant track pitch having formed thereon a reflective layer, a recording layer and a sheet layer laminated in this order. In the optical information recording medium, a thin film sheet layer is provided on the side opposite to the substrate, which has a prescribed thickness (1.2 mm for CD-R), and recording is carried out by irradiation from the side of the thin film sheet layer, whereby the beam diameter of the laser light thus irradiated can be narrowed, and thus high density recording can be carried out with light having a short wavelength of 500 nm or less.

EXAMPLES

The present invention will be described in more detail with reference to the following Examples, but the present invention is not to be construed as being limited thereto. In the following description, all percentages and parts are percentages by weight and parts by weight, respectively.

Example 1

A polycarbonate resin (trade name: PANLITE AD5503 produced by Teijin Chemicals Ltd.) was subjected to injection molding to produce a substrate having a thickness of 1.1 mm and a diameter of 120 mm and having grooves in a spiral form (depth: 100 nm, half-value width: 120 nm, track pitch: 0.3 μm). On the surface of the substrate on which the grooves were present, a reflective layer formed with an Ag film having a thickness of 100 nm was formed by a sputtering method.

2 g of a phthalocyanine organic substance A (ORASOL BLUE GN produced by Ciba Specialty Chemicals, Co., Ltd.) having maximum absorption peaks at 340 nm and 680 nm was mixed with 100 ml of 2,2,3,3-tetrafluoropropanol and then dissolved by subjecting to an ultrasonic treatment for 2 hours to prepare an organic substance coating composition.

The organic substance coating composition was coated on the Ag reflective layer by a spin coating method under conditions of 23° C., 50% RH at a rotation number which varied from 300 to 4,000 rpm, and then maintained at 23° C., 50% RH for 2 hours to form a recording layer having a thickness of 80 nm.

An ultraviolet ray-curable adhesive (trade name: SD-347 produced by Dainippon Ink And Chemicals, Inc.) was coated on the organic substance film by a spin coating method at 200 rpm, and a cover layer formed with a polycarbonate resin sheet (trade name: PUREACE produced by Teijin Ltd.) having a thickness of 0.07 mm was laminated thereon. The adhesive was spread over the entire surface by rotating at a rotation number which varied from 300 to 4,000 rpm, and then irradiated with ultraviolet rays by using an ultraviolet ray irradiation lamp, whereby the adhesive was cured to complete adhesion.

An ultraviolet ray-curable adhesive (trade name: SD-347 produced by Dainippon Ink And Chemicals, Inc., solubility in the organic substance: 0.05%) was further coated on the cover layer by a spin coating method at 200 rpm. The adhesive was spread over the entire surface by rotating at a rotation number which varied from 300 to 4,000 rpm, and then irradiated with ultraviolet rays by using an ultraviolet ray irradiation lamp, whereby the adhesive was cured to produce a sample.

Example 2

A sample was produced in the same manner as in Example 1 except that the organic substance was replaced with a phthalocyanine organic substance B (SUPER GREEN produced by Ciba Specialty Chemicals, Co., Ltd.) having maximum absorption peaks at 330 nm and 730 nm.

Example 3

A sample was produced in the same manner as in Example 1 except that the organic substance was replaced with a phthalocyanine organic substance C (FOM0561 produced by Wako Pure Chemical Industries, Ltd.) having maximum absorption peaks at 340 nm and 680 nm.

Comparative Example 1

A polycarbonate resin (trade name: PANLITE AD5503 produced by Teijin Chemicals Ltd.) was subjected to injection molding to produce a substrate having a thickness of 1.1 mm and a diameter of 120 mm and having grooves in a spiral form (depth: 40 nm, half-value width: 140 nm, track pitch: 0.3 $\mu$m). On the surface of the substrate, on which the grooves were present, a reflective layer formed with an Ag film having a thickness of 100 nm was formed by a sputtering method.

On the reflective layer, a lower heat-resistant protective layer formed with ZnS—$SiO_2$ having a thickness of 170 nm, a recording layer formed with AgInSbTe having a thickness of 25 nm, and an upper heat-resistant protective layer formed with ZnS—$SiO_2$ having a thickness of 35 nm were formed in this order by a sputtering method.

An ultraviolet ray-curable adhesive (trade name: SD-347 produced by Dainippon Ink And Chemicals, Inc.) was coated on the upper heat-resistant protective layer by a spin coating method at 200 rpm, and a cover layer formed with a polycarbonate resin sheet (trade name: PUREACE produced by Teijin Ltd.) having a thickness of 0.07 mm was laminated thereon. The adhesive was spread over the entire surface by rotating at a rotation number which varied from 300 to 4,000 rpm, and then irradiated with ultraviolet rays by using an ultraviolet ray irradiation lamp, whereby the adhesive was cured to complete adhesion.

An ultraviolet ray-curable adhesive (trade name: SD-347 produced by Dainippon Ink And Chemicals, Inc.) was further coated on the cover layer by a spin coating method at 200 rpm. The adhesive was spread over the entire surface by rotating at a rotation number which varied from 300 to 4,000 rpm, and then irradiated with ultraviolet rays by using an ultraviolet ray irradiation lamp, whereby the adhesive was cured to produce a sample.

Comparative Example 2

A sample was produced in the same manner as in Comparative Example 1 except that the recording layer in Comparative Example 1 was replaced with SbTe.

Comparative Example 3

A sample was produced in the same manner as in Example 1 except that the grooves of the substrate of Example 1 were replaced with grooves having a depth of 40 nm, a half-value width of 120 nm and a track pitch of 0.30 $\mu$m.

Comparative Example 4

A sample was produced in the same manner as in Example 1 except that the grooves of the substrate of Example 1 were replaced with grooves having a depth of 160 nm, a half-value width of 120 nm and a track pitch of 0.30 $\mu$m.

Comparative Example 5

A sample was produced in the same manner as in Example 1 except that the organic substance was replaced with an aminobutadiene organic substance a having a $\lambda$max of 360 nm, lower than 400 nm.

The samples of Examples 1 to 3 and Comparative Examples 1 to 5 were evaluated in the following manner.

C/N

The optical disk thus produced was subjected to recording and replaying by using a recording and replaying evaluation apparatus (DDU1000 produced by Pulstec Industrial Co., Ltd.) equipped with a 405 nm laser and a pickup of NA 0.85 at a clock frequency of 66 MHz and a linear velocity of 5.6 m/s, with a single-frequency signal (2T=0.13 $\mu$m), and the C/N was measured by a spectrum analyzer.

Reproducing Durability

The optical disk thus produced was subjected to recording of a 1-7PP modulated signal by using a recording and replaying evaluation apparatus (DDU1000 produced by Pulstec Industrial Co., Ltd.) equipped with a 405 nm laser and a pickup of NA 0.85 at a clock frequency of 66 MHz and a linear velocity of 5.6 m/s (laser power: 6 mW). Replaying was continuously carried out 1,000,000 times in a still mode (laser power: 0.4 mW), and modulation deterioration after 1,000,000 times of replaying was measured, with an initial modulation degree being evaluated as 100%. Results obtained are shown in Table 3.

TABLE 3

|  | Recording layer | Depth of grooves | C/N | Reproducing durability |
|---|---|---|---|---|
| Example 1 | Organic substance A | 100 nm | 55 dB (A) | 98% (A) |
| Example 2 | Organic substance B | 100 nm | 51 dB (A) | 99% (A) |
| Example 3 | Organic substance C | 100 nm | 53 dB (A) | 99% (A) |
| Comparative Example 1 | AgInSbTe | 40 nm | 45 dB (A) | 60% (C) |
| Comparative Example 2 | SbTe | 40 nm | 52 dB (A) | 40% (C) |
| Comparative Example 3 | Organic substance A | 40 nm | 40 dB (C) | 98% (A) |
| Comparative Example 4 | Organic substance A | 160 nm | 30 dB (C) | 95% (A) |
| Comparative Example 5 | Organic substance A | 40 nm | 35 dB (C) | 60% (C) |
| Example 24 | Organic substance A | 70 nm | 51 dB (A) | 100% (A) |

It is understood from Table 3 that when an organic substance having maximum absorption peaks at the particular wavelengths of the present invention is used in the recording layer, and the depth of the grooves is in the range of the present invention, both the C/N and the reproducing durability are excellent, but when the depth of the grooves deviates from the range of the present invention, the C/N is deteriorated even if a recording layer containing the particular organic substance is used. In the case of the samples in which the depth of the grooves was smaller than 50 nm and the recording layer utilized phase change, the reproducing durability was considerably deteriorated. Furthermore, in the case of the sample in which the organic substance having a $\lambda$max of 360 nm was used, and the depth of the grooves was smaller than 50 nm, both the C/N and the reproducing durability were deteriorated.

In the optical recording medium of the present invention, because the recording layer containing the organic substance having at least one maximum absorption peak in each of a range from 600 to 800 nm and a range from 300 to 400 nm is formed on the substrate having the particular grooves formed thereon, both the C/N and the reproducing durability are excellent, and high density recording can be carried out without any problem.

Example 4

A polycarbonate resin (trade name: PANLITE AD5503 produced by Teijin Chemicals Ltd.) was subjected to injection molding to produce a substrate having a thickness of 0.6 mm and a diameter of 120 mm and having grooves in a spiral form (depth: 100 nm, half-value width: 120 nm, track pitch: 0.34 $\mu$m) to produce a substrate.

2 g of a phthalocyanine organic substance A (ORASOL BLUE GN produced by Ciba Specialty Chemicals, Co., Ltd.) having maximum absorption peaks at 340 nm and 680 nm was mixed with 100 ml of 2,2,3,3-tetrafluoropropanol and then dissolved by subjecting to an ultrasonic treatment for 2 hours to prepare an organic substance coating composition.

The organic substance coating composition was coated on the surface of the substrate, on which the grooves were formed, by a spin coating method under conditions of 23° C., 50% RH at a rotation number which varied from 300 to 4,000 rpm, and then maintained at 23° C., 50% RH for 2 hours to form a recording layer having a thickness of 80 nm in the grooves.

A reflective layer formed with an Ag film having a thickness of 100 nm was formed on the recording layer by a sputtering method.

An ultraviolet ray-curable adhesive (trade name: SD-640 produced by Dainippon Ink And Chemicals, Inc.) was then coated at 40° C. by a spin coating method at 200 rpm, and a polycarbonate resin substrate having a thickness of 0.6 mm was laminated thereon. The adhesive was spread over the entire surface by rotating at a rotation number which varied from 300 to 4,000 rpm, and then cured by irradiating with ultraviolet rays by using an ultraviolet ray irradiation lamp to produce a sample.

Example 5

A sample was produced in the same manner as in Example 4 except that the organic substance was replaced with a phthalocyanine organic substance B (SUPER GREEN produced by Ciba Specialty Chemicals, Co., Ltd.) having maximum absorption peaks at 330 nm and 730 nm.

Example 6

A sample was produced in the same manner as in Example 4 except that the organic substance was replaced with a phthalocyanine organic substance C (FOM0561 produced by Wako Pure Chemical Industries, Ltd.) having maximum absorption peaks at 340 nm and 680 nm.

Comparative Example 6

A polycarbonate resin (trade name: PANLITE AD5503 produced by Teijin Chemicals Ltd.) was subjected to injection molding to produce a substrate having a thickness of 0.6 mm and a diameter of 120 mm and having grooves in a spiral form (depth: 40 nm, half-value width: 120 nm, track pitch: 0.34 $\mu$m). On the surface of the substrate, on which the grooves were present, a lower heat-resistant protective layer formed with ZnS—SiO$_2$ having a thickness of 170 nm, a recording layer formed with AgInSbTe having a thickness of 25 nm, an upper heat-resistant protective layer formed with ZnS—SiO$_2$ having a thickness of 35 nm, and a reflective layer formed with an Ag film having a thickness of 100 nm were formed by a sputtering method.

An ultraviolet ray-curable adhesive (trade name: SD-640 produced by Dainippon Ink And Chemicals, Inc.) was coated on the reflective layer at 40° C. by a spin coating method at 200 rpm, and a polycarbonate resin substrate having a thickness of 0.6 mm was laminated thereon. The adhesive was spread over the entire surface by rotating at a rotation number which varied from 300 to 4,000 rpm, and then cured by irradiating with ultraviolet rays by using an ultraviolet ray irradiation lamp to complete adhesion.

Comparative Example 7

A sample was produced in the same manner as in Comparative Example 6 except that the recording layer in Comparative Example 6 was replaced with SbTe.

Comparative Example 8

A sample was produced in the same manner as in Example 4 except that the grooves of the substrate of Example 4 were replaced with grooves having a depth of 40 nm, a half-value width of 120 nm and a track pitch of 0.34 $\mu$m.

Comparative Example 9

A sample was produced in the same manner as in Example 4 except that the grooves of the substrate of Example 4 were replaced with grooves having a depth of 160 nm, a half-value width of 120 nm and a track pitch of 0.34 $\mu$m.

Comparative Example 10

A sample was produced in the same manner as in Example 4 except that the organic substance was replaced with an aminobutadiene organic substance a having a λmax of 360 nm, lower than 400 nm.

The samples of Examples 4 to 6 and Comparative Examples 6 to 10 were evaluated in the following manner.

C/N

The optical disk thus produced was subjected to recording (laser power: 1.0 mW) and replaying (laser power: 0.6 mW) by using a recording and replaying evaluation apparatus (DDU1000 produced by Pulstec Industrial Co., Ltd.) equipped with a 405 nm laser and a pickup of NA 0.65 at a clock frequency of 20 MHz and a linear velocity of 2.0 m/s, with a single-frequency signal (3T=0.29 μm), and the C/N was measured by a spectrum analyzer.

Reproducing Durability

The optical disk thus produced was subjected to recording of an EMF modulated signal by using a recording and replaying evaluation apparatus (DDU1000 produced by Pulstec Industrial Co., Ltd.) equipped with a 405 nm laser and a pickup of NA 0.65 at a clock frequency of 20 MHz and a linear velocity of 2.0 m/s (laser power: 1.0 mW). Replaying was carried out in a still mode (laser power: 0.6 mW), and modulation deterioration after 1,000,000 times of continuous replaying was measured, with an initial modulation degree being evaluated as 100%. Results obtained are shown in Table 4.

TABLE 4

| | Recording layer | Depth of grooves | C/N | Reproducing durability |
|---|---|---|---|---|
| Example 4 | Organic substance A | 100 nm | 55 dB (A) | 100% (A) |
| Example 5 | Organic substance B | 100 nm | 51 dB (A) | 99% (A) |
| Example 6 | Organic substance C | 100 nm | 53 dB (A) | 99% (A) |
| Comparative Example 6 | AgInSbTe | 40 nm | 49 dB (A) | 40% (C) |
| Comparative Example 7 | GeSbTe | 40 nm | 45 dB (B) | 45% (C) |
| Comparative Example 8 | Organic substance A | 40 nm | 35 dB (C) | 98% (A) |
| Comparative Example 9 | Organic substance A | 160 nm | 30 dB (C) | 95% (A) |
| Comparative Example 10 | Organic substance A | 40 nm | 35 dB (C) | 50% (C) |

It is understood from Table 4 that when an organic substance having maximum absorption peaks at the particular wavelengths of the pre sent invention is used in the recording layer, and the depth of the grooves is in the range of the present invention, both the C/N and the reproducing durability are excellent, but when the depth of the grooves deviates from the range of the present invention, the C/N is deteriorated even if a recording layer containing the particular organic substance is used. In the case of the samples, in which the depth of the grooves was smaller than 50 nm, and the recording layer utilized phase change, the reproducing durability was considerably deteriorated. Furthermore, in the case of the sample in which the organic substance having a λmax of 360 nm was used, and the depth of the grooves was smaller than 50 nm, both the C/N and the reproducing durability were deteriorated.

In the optical recording medium of the present invention, because the recording layer containing the organic substance having at least one maximum absorption peak in each of a range from 600 to 800 nm and a range from 300 to 400 nm is formed on the substrate having the particular grooves formed thereon, both the C/N and the reproducing durability are excellent, and high density recording can be carried out without any problem.

A: Examples of Phthalocyanine Organic Substance Recording Layer

Examples 7 to 11 and 15 to 18, and Comparative Examples 11, 12, 15 and 16

A substrate formed with a polycarbonate resin (trade name: PANLITE AD5503 produced by Teijin Chemicals Ltd.) by injection molding having a thickness of 1.2 mm and a diameter of 120 mm and having grooves in a spiral form (with depth, track pitch, half-value width and tilt angle as shown in Table 5) was prepared. On the surface of the substrate on which the grooves were present, a reflective layer having a thickness of 100 nm was formed by sputtering Ag. Separately, a phthalocyanine produced by Ciba Specialty Chemicals, Co., Ltd. (ORASOL BLUE GN) was mixed with 2,2,3,3-tetrafluoropropanol and then dissolved by applying ultrasonic waves for 2 hours to obtain a coating composition for forming a recording layer (concentration: 2% by weight). The organic compound coating composition was coated by a spin coating method under conditions of 23° C., 50% RH at a rotation number which varied from 300 to 4,000 rpm. Thereafter, after storing at 23° C., 50% RH for 1 hour, ZnS—SiO$_2$ was sputtered to make a thickness of 5 nm. A UV-curable adhesive (SD-640 produced by Dainippon Ink And Chemicals, Inc.) was coated by a spin coating method at a rotation number which varied from 100 to 300 rpm, and a polycarbonate sheet (PUREACE produced by Teijin Ltd., thickness: 70 μm) was laminated thereon. The adhesive was spread over the entire surface by rotating at a rotation number which varied from 300 to 4,000 rpm, and then irradiated with ultraviolet rays by using a UV irradiation lamp, whereby the adhesive was cured to produce samples of optical information recording media (optical disks) of Examples 7 to 11 and 15 to 18 according to the present invention and Comparative Examples 11, 12, 15 and 16.

B: Examples of Benzotriazole Organic Substance Recording Layer

Examples 12 to 14 and 19 to 23, and Comparative Examples 13, 14, 17 and 18

A substrate formed with a polycarbonate resin (trade name: PANLITE AD5503 produced by Teijin Chemicals Ltd.) by injection molding having a thickness of 1.2 mm and a diameter of 120 mm and having grooves in a spiral form (with depth, track pitch, half-value width and tilt angle as shown in Table 5) was prepared. On the surface of the substrate on which the grooves were present, a reflective layer having a thickness of 100 nm was formed by sputtering Ag. Separately, the following Compound 1 (benzotriazole) was mixed with 2,2,3,3-tetrafluoropropanol and then dissolved by applying ultrasonic waves for 2 hours to obtain a coating composition for forming a recording layer (concentration: 2% by weight). The organic compound coating composition was coated by a spin coating method under conditions of 23° C., 50% RH at a rotation number which varied from 300 to 4,000 rpm. Thereafter, after storing at 23° C., 50% RH for 1 hour, ZnS—$SiO_2$ was sputtered to make a thickness of 5 nm. A UV-curable adhesive (SD-640 produced by Dainippon Ink And Chemicals, Inc.) was coated by a spin coating method at a rotation number which varied from 100 to 300 rpm, and a polycarbonate sheet (PUREACE produced by Teijin Ltd., thickness: 70 μm) was laminated thereon. The adhesive was spread over the entire surface by rotating at a rotation number which varied from 300 to 4,000 rpm, and then irradiated with ultraviolet rays by using a UV irradiation lamp, whereby the adhesive was cured to produce samples of optical information recording media (optical disks) of Examples 12 to 14 and 19 to 23 according to the present invention and Comparative Examples 13, 14, 17 and 18.

Evaluation as Optical Disks

The optical information recording media (optical disks) thus prepared were subjected to recording with a 3T-EFM signal by using a blue semiconductor laser having an oscillation wavelength of 405 nm at a linear velocity of 3.5 m/sec through a lens system having an aperture (NA) of 0.85, and then the recorded signal was replayed. The reflectivity of non-recorded grooves was measured by using "DDU1000" produced by Pulstec Industrial Co., Ltd. equipped with a 405 nm blue semiconductor laser and a lens system of an aperture (NA) of 0.85. A 3T signal was recorded at 8 mW, and the sensitivity (C/N) thereof was measured. The evaluation results are shown in Table 5.

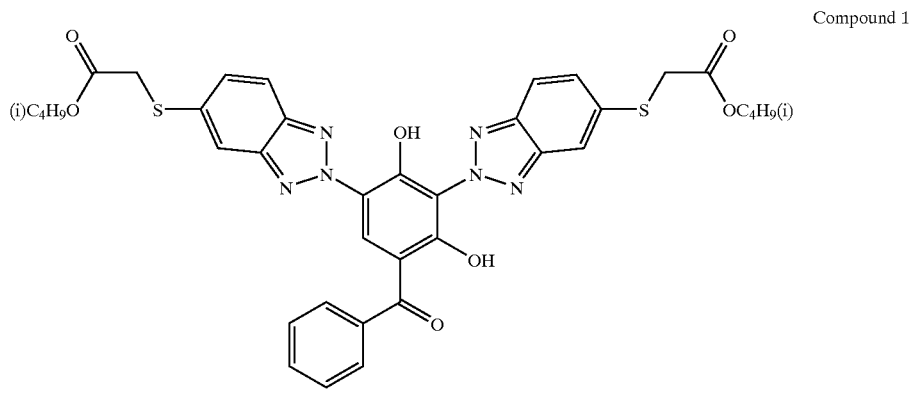

Compound 1

TABLE 5

| | Organic substance | Depth of grooves (nm) | Track pitch (nm) | Half-value Width of grooves (nm) | Tilt angle of grooves (°) | Reflectivity of non-recorded grooves (%) | C/N |
|---|---|---|---|---|---|---|---|
| Comparative Example 11 | D | 10 | 300 | 100 | 70 | 31 | 33 |
| Example 7 | D | 15 | 300 | 100 | 70 | 61 | 53 |
| Example 8 | D | 20 | 300 | 100 | 70 | 70 | 54 |
| Example 9 | D | 30 | 300 | 100 | 70 | 65 | 56 |
| Example 10 | D | 40 | 300 | 100 | 70 | 64 | 55 |
| Example 11 | D | 45 | 300 | 100 | 70 | 59 | 51 |
| Comparative Example 12 | D | 50 | 300 | 100 | 70 | 29 | 36 |
| Comparative Example 13 | E | 30 | 240 | 100 | 70 | 26 | 36 |
| Example 12 | E | 30 | 250 | 100 | 70 | 57 | 58 |
| Example 13 | E | 30 | 300 | 100 | 70 | 59 | 60 |
| Example 14 | E | 30 | 400 | 100 | 70 | 55 | 56 |
| Comparative Example 14 | E | 30 | 410 | 100 | 70 | 25 | 36 |
| Comparative Example 15 | D | 30 | 300 | 50 | 70 | 38 | 35 |
| Example 15 | D | 30 | 300 | 60 | 70 | 53 | 50 |
| Example 16 | D | 30 | 300 | 80 | 70 | 61 | 52 |
| Example 17 | D | 30 | 300 | 150 | 70 | 64 | 54 |
| Example 18 | D | 30 | 300 | 200 | 70 | 64 | 51 |
| Comparative Example 16 | D | 30 | 300 | 220 | 70 | 15 | 34 |
| Comparative Example 17 | E | 30 | 300 | 80 | 35 | 16 | 37 |

TABLE 5-continued

|  | Organic substance | Depth of grooves (nm) | Track pitch (nm) | Half-value Width of grooves (nm) | Tilt angle of grooves (°) | Reflectivity of non-recorded grooves (%) | C/N |
|---|---|---|---|---|---|---|---|
| Example 19 | E | 30 | 300 | 80 | 40 | 50 | 53 |
| Example 20 | E | 30 | 300 | 80 | 50 | 53 | 54 |
| Example 21 | E | 30 | 300 | 80 | 60 | 56 | 58 |
| Example 22 | E | 30 | 300 | 80 | 70 | 58 | 59 |
| Example 23 | E | 30 | 300 | 80 | 80 | 51 | 52 |
| Comparative Example 18 | E | 30 | 300 | 80 | 85 | 33 | 33 |

Note:
D: Phthalocyanine organic substance
E: Benzotriazole organic substance

It was found from the results in Table 5 that the optical disks according to the present invention (Examples 7 to 23) exhibited a high reflectivity to laser light having a wavelength of 405 nm condensed by passing through a lens having an aperture (NA) of 0.85 and had a high sensitivity in comparison to the optical disks of Comparative Examples 11 to 18. Therefore, it is understood that by using the optical information recording medium according to the present invention, an optical disk can be obtained that has high recording characteristics to short wavelength laser light having a wavelength of from 380 to 500 nm passing through a lens having an aperture (NA) of 0.7 or more.

The medium has a recording layer containing an organic substance and grooves having a depth of from 15 to 45 nm, a track pitch of from 250 to 400 nm, a half-value width of from 60 to 200 nm and a tilt angle of from 40 to 80°, and thus exhibits effects such that high density recording and replaying of information can be carried out by irradiating with short wavelength laser light having a wavelength of from 380 to 500 nm, and good recording and replaying characteristics, such as high sensitivity and high reflectivity, are exhibited. Therefore, recording of information can be carried out at a higher density than the conventional CD-R and DVD-R, and information in a larger capacity can be recorded.

What is claimed is:

1. An optical recording medium comprising:
   a substrate comprising an organic substance with at least one maximum absorption peak in each of a range from 600 to 800 nm and a range from 300 to 400 nm, the substrate comprising a groove that comprises a track pitch of from 200 to 400 nm, a groove depth of from 50 to 150 nm and a groove half-value width of from 90 to 200 nm;
   a reflective layer on the substrate;
   a recording layer on the reflective layer; and
   a cover layer on the recording layer, wherein the medium is recordable and replayable using laser light comprising a wavelength of 450 nm or less and an objective lens comprising an aperture NA of 0.7 or more.

2. An optical recording medium as claimed in claim 1, wherein the organic substance comprises an organic substance selected from the group consisting of cyanine organic substances, aminobutadiene organic substances, benzotriazole organic substances, phthalocyanine organic substances and rhodocyanine organic substances.

3. An optical recording medium as claimed in claim 1, wherein the organic substance comprises a phthalocyanine organic substance with at least one maximum absorption peak in each of a range from 600 to 700 nm and the range from 300 to 400 nm.

4. An optical recording medium as claimed in claim 1, wherein the substrate comprises polycarbonate.

5. An optical recording medium as claimed in claim 1, wherein the reflective layer comprises a noble metal selected from the group consisting of Au and Ag.

6. An optical recording medium as claimed in claim 1, wherein the groove depth is from 60 to 110 nm.

7. An optical recording medium comprising:
   a substrate comprising an organic substance with at least one maximum absorption peak in each of a range from 600 to 800 nm and a range from 300 to 400 nm, the substrate comprising a groove that comprises a track pitch of from 200 to 400 nm, a groove depth of from 50 to 150 nm and a groove half-value width of from 90 to 200 nm;
   a reflective layer on the substrate; and
   a recording layer on the reflective layer, wherein the medium is recordable and replayable using laser light comprising a wavelength of 450 nm or less and an objective lens comprising an aperture NA that is at least 0.5 and less than 0.7.

8. An optical recording medium as claimed in claim 7, wherein the organic substance comprises an organic substance selected from the group consisting of cyanine organic substances, aminobutadiene organic substances, benzotriazole organic substances, phthalocyanine organic substances and rhodocyanine organic substances.

9. An optical recording medium as claimed in claim 7, wherein the organic substance comprises a phthalocyanine organic substance with at least one maximum absorption peak in each of a range from 600 to 700 nm and the range from 300 to 400 nm.

10. An optical recording medium as claimed in claim 7, wherein the substrate comprises polycarbonate.

11. An optical recording medium as claimed in claim 7, wherein the reflective layer comprises a noble metal selected from the group consisting of Au and Ag.

12. An optical recording medium as claimed in claim 7, wherein the groove depth is from 80 to 120 nm.

13. An optical information recording medium comprising:
    a substrate comprising a groove depth of from 15 to 45 nm, a track pitch of from 250 to 400 nm, a groove half-value width of from 60 to 200 nm and a groove tilt angle of from 40° to 80°;
    a reflective layer on the substrate;
    a recording layer comprising an organic substance on the reflective layer, at which recording layer information is recordable and replayable by irradiating laser light comprising a wavelength of from 380 to 500 nm through a lens comprising an aperture NA of 0.7 or more; and
    a sheet layer on the recording layer.

14. An optical information recording medium as claimed in claim 13, wherein the organic substance comprises a phthalocyanine derivative.

15. An optical information recording medium as claimed in claim 14, wherein the phthalocyanine derivative comprises a compound represented by the following general formula (I):

General Formula (I)

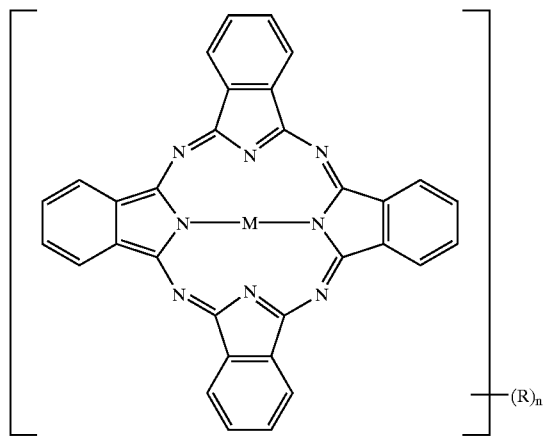

in which: R represents a substituent; n represents an integer from 1 to 8; if n is 2 or more, then the plurality of groups represented by R may be the same as each other or different from each other; and M represents two hydrogen atoms, a metal, a metallic oxide or a metal comprising a ligand.

16. An optical information recording medium as claimed in claim 13, wherein the organic substance comprises a benzotriazole derivative.

17. An optical information recording medium as claimed in claim 16, wherein the benzotriazole derivative comprises a compound represented by the following general formula (II):

General Formula (II)

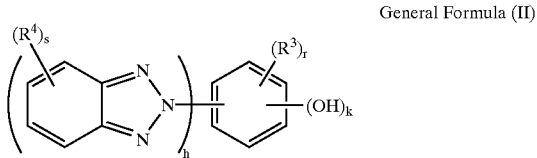

in which: h and k each independently represents an integer from 1 to 3; $R^3$ and $R^4$ represent substituents; r and s represent integers from 0 to 3; and if h=1 and r≠0, then $R^3$ and $R^4$ each independently represents a substituent selected from the group consisting of alkyl groups having from 2 to 16 carbon atoms, aryl groups having from 6 to 14 carbon atoms, aralkyl groups having from 7 to 15 carbon atoms, alkoxy groups having from 1 to 16 carbon atoms, aryloxy groups having from 6 to 14 carbon atoms, alkoxycarbonyl groups having from 2 to 17 carbon atoms, carbamoyl groups having from 1 to 10 carbon atoms, amide groups having from 1 to 10 carbon atoms, acyloxy groups having from 2 to 17 carbon atoms and halogen atoms.

18. An optical information recording medium as claimed in claim 13, wherein the track pitch of the substrate is in a range from 280 to 350 nm.

19. An optical information recording medium as claimed in claim 13, wherein the groove half-value width of the substrate is in a range from 80 to 150 nm.

20. An optical information recording medium as claimed in claim 13, wherein the groove depth of the substrate is in a range from 20 to 40 nm.

* * * * *